United States Patent
Nakamura et al.

(10) Patent No.: US 11,601,604 B2
(45) Date of Patent: Mar. 7, 2023

(54) STUDIO EQUIPMENT CONTROL SYSTEM AND METHOD OF CONTROLLING STUDIO EQUIPMENT CONTROL SYSTEM

(71) Applicant: SONY CORPORATION, Tokyo (JP)

(72) Inventors: Sensaburo Nakamura, Kanagawa (JP); Hidehito Yakushiji, Kanagawa (JP); Norimasa Ozaki, Kanagawa (JP); Takafumi Ito, Kanagawa (JP); Naomi Egashira, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 222 days.

(21) Appl. No.: 16/316,212

(22) PCT Filed: Jul. 19, 2017

(86) PCT No.: PCT/JP2017/026096
§ 371 (c)(1),
(2) Date: Jan. 8, 2019

(87) PCT Pub. No.: WO2018/021112
PCT Pub. Date: Feb. 1, 2018

(65) Prior Publication Data
US 2019/0253640 A1    Aug. 15, 2019

(30) Foreign Application Priority Data

Jul. 27, 2016 (JP) .............................. JP2016-146939

(51) Int. Cl.
*H04N 5/268* (2006.01)
*H04N 5/265* (2006.01)
(Continued)

(52) U.S. Cl.
CPC ............ *H04N 5/268* (2013.01); *H04H 20/10* (2013.01); *H04N 5/265* (2013.01); *H04N 5/2622* (2013.01)

(58) Field of Classification Search
CPC ........ H04H 20/10; H04H 20/59; H04N 5/268; H04N 5/2622; H04N 5/265
(Continued)

(56) References Cited

U.S. PATENT DOCUMENTS 5,051,845 A * 9/1991 Gardner ............... G11B 27/034
386/278
5,282,038 A * 1/1994 Lowe ..................... H04N 5/268
348/659
(Continued)

FOREIGN PATENT DOCUMENTS

EP          0920014 A1     6/1999
JP       2010-103960 A    5/2010
(Continued)

OTHER PUBLICATIONS

International Search Report and Written Opinion of PCT Application No. PCT/JP2017/026096, dated Oct. 17, 2017, 11 pages of ISRWO.

(Continued)

*Primary Examiner* — John W Miller
*Assistant Examiner* — Sean N. Haiem
(74) *Attorney, Agent, or Firm* — Chip Law Group

(57) ABSTRACT

To improve user operability.
Provided is a Next change operating section that receives a changing operation on each item in a Next control data set being in a control state of a Next-use M/E of a switcher (vision mixer). When a changing operation is received in the Next change operating section, that is, when there is a changing operation, a control section changes contents of the Next control data set, and in accordance with the changed contents of the Next control data set, sends a control signal concerning the Next-use M/E to the switcher. A user can simply and easily change the contents of the Next
(Continued)

control data set by operating the Next change operating section, and operability can be improved.

10 Claims, 36 Drawing Sheets

(51) Int. Cl.
    *H04H 20/10*     (2008.01)
    *H04N 5/262*     (2006.01)

(58) Field of Classification Search
    USPC ........ 348/578, 705, 722, 523, 660; 345/629, 345/619; 725/95; 386/281, 290
    See application file for complete search history.

(56) References Cited

U.S. PATENT DOCUMENTS

| | | | |
|---|---|---|---|
| 5,530,434 A * | 6/1996 | Kanda | G06F 13/4027 340/2.2 |
| 9,462,195 B2 * | 10/2016 | Krug | H04N 5/265 |
| 9,723,193 B2 * | 8/2017 | Takahashi | H04N 5/247 |
| 2003/0086686 A1 * | 5/2003 | Matsui | G11B 27/034 386/281 |
| 2003/0091329 A1 * | 5/2003 | Nakata | G11B 27/34 386/281 |
| 2007/0182864 A1 * | 8/2007 | Stoneham | G06F 3/0488 348/722 |
| 2008/0019388 A1 * | 1/2008 | Harmon | H04L 45/00 370/412 |
| 2009/0092326 A1 * | 4/2009 | Fukuhara | H04N 19/176 382/233 |
| 2010/0103325 A1 * | 4/2010 | Maegawa | H04N 5/272 348/705 |
| 2011/0029099 A1 * | 2/2011 | Benson | G11B 27/034 700/17 |
| 2011/0052155 A1 * | 3/2011 | Desmarais | H04N 21/4788 386/290 |
| 2012/0194442 A1 * | 8/2012 | Sheeley | H04N 21/482 345/173 |
| 2012/0256946 A1 * | 10/2012 | Nakamura | G06T 13/20 345/619 |
| 2013/0222601 A1 * | 8/2013 | Engstrom | H04N 5/265 348/159 |
| 2014/0040781 A1 * | 2/2014 | Epstein | A47B 13/08 715/753 |
| 2014/0092128 A1 * | 4/2014 | Nakamura | G06T 13/80 345/629 |
| 2014/0344873 A1 * | 11/2014 | Rieger | H04N 7/10 725/95 |
| 2015/0116595 A1 * | 4/2015 | Nakamura | H04N 21/6106 348/523 |
| 2015/0172559 A1 * | 6/2015 | Krug | H04N 5/262 348/660 |
| 2015/0296147 A1 * | 10/2015 | Obstfelder | H04N 21/2187 348/705 |
| 2016/0248989 A1 * | 8/2016 | Cross | H04N 21/2365 |
| 2016/0277806 A1 * | 9/2016 | Obstfelder | H04N 21/64322 |

FOREIGN PATENT DOCUMENTS

| | | |
|---|---|---|
| JP | 2012-221122 A | 11/2012 |
| JP | 2015-084468 A | 4/2015 |
| WO | 98/47146 A1 | 10/1998 |

OTHER PUBLICATIONS

Office Action for JP Patent Application No. 2018-529807 dated Aug. 31, 2021, 05 pages of Office Action and 05 pages of English Translation.

* cited by examiner

Xpt BUTTON ROW ARRANGED SECTION

FUNCTION ASSIGN BUTTON SECTION (1)

FUNCTION ASSIGN BUTTON SECTION (2)

FUNCTION ASSIGN BUTTON SECTION (3)

EXAMPLE OF GUI DISPLAY

During Transition of "OnAir to Next" by "Take" or Fader Lever Operation

BEFORE Take

Toggle On SETTING AFTER Take

GUI for setting an Assign Table to a Control Data Set

FIRST TEMPORARY LIGHTING STATE OPERATION OF
BUTTON ASSIGNED TO BE STORED
IN SET OF CONTROL DATA (Dim
SIMULTANEOUS LIGHTING STATE OF BUTTONS
OTHER THAN RELEVANT BUTTON

SECOND TEMPORARY LIGHTING STATE IN
OPERATION OF BUTTON ASSIGN TO BE
STORED IN SET OF CONTROL DATA

FIG. 41
EXAMPLE OF PAGE FUNCTION OF FUNCTION
ASSIGN BUTTON SECTION (1)
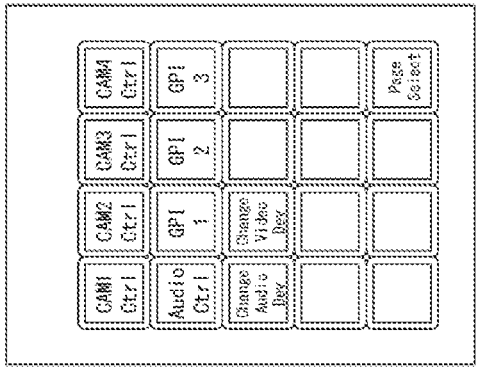
(C) STATE WHERE Page 2 HAS BEEN BROUGHT ABOUT
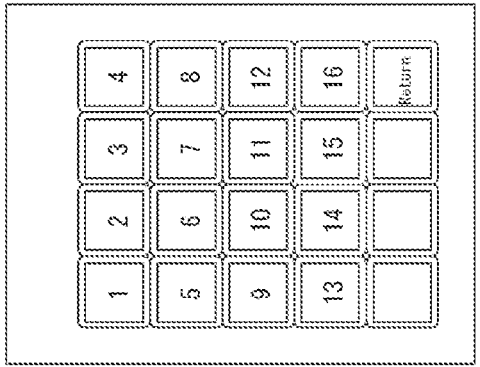
(b) Page SELECTION STATE
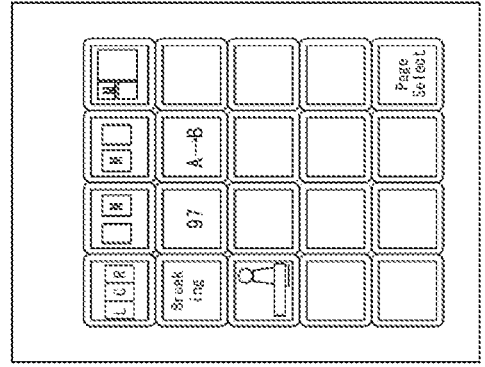
(a) STATE WHERE Page 1 HAS BEEN BROUGHT ABOUT

STUDIO EQUIPMENT CONTROL SYSTEM AND METHOD OF CONTROLLING STUDIO EQUIPMENT CONTROL SYSTEM

CROSS REFERENCE TO RELATED APPLICATIONS

This application is a U.S. National Phase of International Patent Application No. PCT/JP2017/026096 filed on Jul. 19, 2017, which claims priority benefit of Japanese Patent Application No. JP 2016-146939 filed in the Japan Patent Office on Jul. 27, 2016. Each of the above-referenced applications is hereby incorporated herein by reference in its entirety.

TECHNICAL FIELD

The present technology relates to a studio equipment control system, a method of controlling a studio equipment control system, and a program.

BACKGROUND ART

A vision mixer has one or a plurality of video signal processing units, each being called a Mix Effect Section/Bank (M/E), and achieves Picture-In-Picture and a video switching transition by wiping, and the like. Note that the vision mixer may be called a switcher as well.

A dedicated control panel is prepared for the vision mixer, which, upon receipt of a selection of an input video signal by button pressing or an operation with a fader lever, makes a reaction in real time to change the state of video signal processing. In addition, the vision mixer may run or may be operated upon receipt of a control signal from a system that controls another pieces of equipment or a studio (for example, see Patent Literature 1).

CITATION LIST

Patent Literature

Patent Literature 1: JP 2010-103960A

DISCLOSURE OF INVENTION

Technical Problem

The present technology has an object to improve user operability.

Solution to Problem

A concept of the present technology resides in a studio equipment control system including: a Next change operating section configured to receive a changing operation on each item in a Next control data set being in a control state of a Next-use M/E of a switcher; and a control section configured to, when the changing operation is present, change a content of the Next control data set, and in accordance with the changed content of the Next control data set, send a control signal concerning the Next-use M/E to the switcher.

According to the present technology, a Next change operating section configured to receive a changing operation on each item in a Next control data set being in a control state of a Next-use M/E of a switcher is included. For example, the Next change operating section may include an edit GUI section configured to receive a changing operation on each item of the Next control data set. In addition, for example, the Next change operating section may include a xpt button row configured to perform an operation input of selecting a video signal on a xpt circuit belonging to the Next-use M/E.

When a changing operation is received by the Next change operating section, that is, when there is a changing operation, the contents of the Next control data set are changed by the control section, and in accordance with the changed contents of the Next control data set, a control signal concerning a Next-use M/E is sent to the switcher.

In this manner, in the present technology, the Next change operating section is provided, and when a changing operation is received by this Next change operating section, the contents of the Next control data set are changed, and in accordance with the changed contents of the Next control data set, a control signal concerning the Next-use M/E is sent to the switcher. Thus, a user can simply and easily change the contents of the Next control data set by operating the Next change operating section, and operability can be improved.

Note that, in the present technology, a display GUI section that displays the contents of the Next control data set may further be provided, for example. In addition, in the present technology, a transition operating section that causes an output video signal of the switcher to transition from an output of the OnAir-use M/E to an output of the Next-use M/E may further be provided, for example. In this case, for example, the transition operating section may include a fader lever that manually controls progress so as to gradually transition from the output of the OnAir-use M/E to the output of the Next-use M/E. In addition, in this case, for example, the transition operating section may include a button section that sends a take trigger to the control section so as to transmit a control signal that instructs a transition to control in accordance with the Next control data set to the switcher.

In addition, another concept of the present technology resides in a studio equipment control system including: a control data set memory configured to store a plurality of control data sets in which control contents for a switcher are compiled; a device controller configured to send a control signal to the switcher; an OnAir control state display GUI section configured to display a content of an OnAir control data set being in a control state of an OnAir-use M/E of the switcher; a Next control state display GUI section configured to display a content of the Next control data set being in a control state of the Next-use M/E of the switcher; a data controller configured to manage the OnAir control data set and the Next control data set; any of an OnAir edit GUI section configured to receive a changing operation on each item of the content of the OnAir control data set to send a changing instruction to the data controller or a Next edit GUI section configured to receive a changing operation on each item of the content of the Next control data set to send a changing instruction to the data controller; an OnAir xpt button row configured to perform an operation input of selecting a video signal on a xpt circuit belonging to the OnAir-use M/E; a Next xpt button row configured to perform an operation input of selecting a video signal on a xpt circuit belonging to the Next M/E; a plurality of OnAir recall button sections to each of which one control data set in the control data set memory is assigned as an option, the plurality of OnAir recall button sections being configured to cause an assigned control data set to be copied to the OnAir control data set by pressing down; a plurality of Next recall button sections to each of which one control data set in the control data set memory is assigned as an option, the plurality of Next recall button sections being configured to cause an assigned control data set to be copied to the Next control data set by pressing down; a fader lever configured to manually control progress so as to cause an output video signal of the switcher to gradually transition from an output of the OnAir-use M/E to an output of the Next-use M/E; and a button section configured to send a take trigger to the device controller so as to transmit a control signal that instructs a transition to control in accordance with the Next control data set to the switcher. The data controller updates a corresponding value in the Next control data set in response to an operation that the Next xpt button row has received. When the content of the OnAir control data set is changed, the data controller sends a control signal concerning the OnAir-use M/E to the switcher in accordance with the content of the OnAir control data set. When the content of the Next control data set is changed, the data controller sends a control signal concerning the Next-use M/E to the switcher in accordance with the content of the Next control data set. Upon receipt of the take trigger, the device controller sends a control signal that instructs start of a transition to the switcher in accordance with the Next control data set.

In this case, for example, on a first panel area, the OnAir xpt button row may include a continuous predetermined number of buttons from one end of a row among a plurality of buttons arranged in a row, and the Next xpt button row may include a continuous button row other than the OnAir xpt button row among the plurality of buttons arranged in a row. A plurality of the OnAir recall buttons may be arranged on a second panel area. The first panel area and the second panel area may be arranged in an identical row.

Advantageous Effects of Invention

According to the present technology, operability can be improved. Note that the effects described herein are not necessarily limitative, and may be any one of the effects described in the present disclosure.

BRIEF DESCRIPTION OF DRAWINGS

FIGS. 41A, 41B, and 41C are diagrams showing an example of a page function of the function assign button section (1).

MODE(S) FOR CARRYING OUT THE INVENTION

Hereinafter, mode(s) (hereinafter referred to as "embodiment(s)") for carrying out the invention will be described. Note that description will be provided in the following order.
1. Embodiment
2. Variation

1. Embodiment

[Exemplary Configuration of Studio Equipment Control System]

First, an overview of a studio equipment control system of the present technology will be described. This studio equipment control system has a memory function of holding a set of control data (an OnAir control data set) called OnAir (being used for control for an actual broadcast output and the like at that point of time) and a set of control data (a Next control data set) called Next (planned to be used next for equipment control), and in addition, storing another plurality of sets of control data. The OnAir control data set and the Next control data set are read into a memory of a data controller at system startup or when a recall button is operated.

When the OnAir control data is updated, the data controller immediately changes, via a device controller, the operating state of an OnAir-use portion of to-be-controlled equipment to a state in accordance with the OnAir control data. On the other hand, when the Next control data is updated, the data controller immediately changes, via the device controller, the operating state of a signal processing section concerning Next, not used for OnAir, among the operating states of some pieces of the to-be-controlled equipment, for example, the operating state of a Next-use M/E for the vision mixer, and in the case where mixing for Next can be performed with an audio mixer, the operating state of the audio mixer, to a state in accordance with the Next control data.

In addition, when a take button is pressed down, or when a fader lever is moved with one stroke, the operating state of the to-be-controlled equipment is caused to transition from the state in accordance with the OnAir control data to the state in accordance with the Next control data. After this transition is completed, the Next control data is made equal to the value of the original OnAir control data as an example of operation. Then, a Next-specific signal processing section is controlled so as to be in accordance with the new Next control data.

As another example, a playlist in which a set of control data is in a permutation may further be included. In that case, along with a transition caused by a Take, control is exerted such that elements subsequent to the permutation become the Next control data. As a result, in accordance with elements (a set of data) of the permutation, signal processing for OnAir progresses sequentially. However, in the case where the OnAir control data or the Next control data is subjected to a manual operation, contents of the original permutation are overwritten by the manual operation. Progress of the permutation can also be performed each time when a set time arrives for each set.

Figure 1:
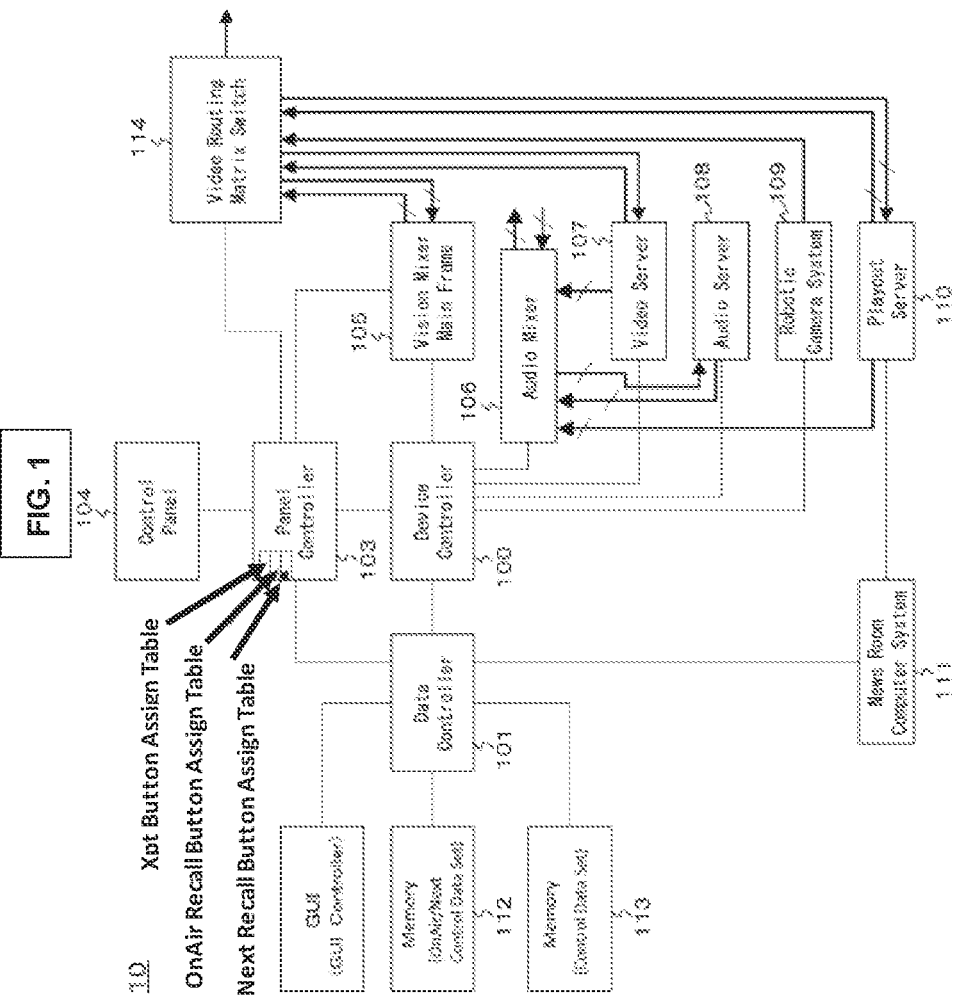
FIG. 1 is a block diagram showing an exemplary configuration of a studio equipment control system.

FIG. 1 shows an exemplary configuration of a studio equipment control system 10. The studio equipment control system 10 has a device controller 100, a data controller 101, a graphical user interface controller (GUI controller) 102, a panel controller 103, and a control panel 104.

In addition, the studio equipment control system 10 has a vision mixer (vision mixer main frame) 105, an audio mixer 106, a video server 107, an audio server 108, a robotic camera system 109, a playout server 110, a news room computer system 111, memories 112, 113, and a video routing matrix switch (video routing) 114.

In the illustrated example, thin connection lines indicate communication channels of a control system, and thick connection lines indicate exemplary routes of a video/audio system. The output of the video routing matrix switch 114 is also connected to broadcast delivery equipment, an in-studio monitor, and the like, although not shown. In addition, actually, an audio router is also used for an audio system, whilst the audio mixer 106 is depicted as including the function of the audio router in the illustrated example. The audio input also includes a microphone or the like, and a destination includes broadcast delivery equipment or the like. Further, the video routing matrix switch 114 may also perform audio routing. In addition, an audio signal may have been superimposed on a video signal.

Each controller can be implemented by software in a computer. In addition, the memories 112, 113 can be implemented by the storing function in a computer. In addition, the memories 112, 113 may be a common memory. The device controller 100 sends control signals to the audio mixer 106, the video server 107, the audio server 108, the robotic camera system 109, and the vision mixer 105. The data controller 101 manages the OnAir control data set and the Next control data set.

The GUI controller 102 provides a GUI function, and communicates with the data controller 101. Upon receipt of a changing operation on each item of the OnAir control data set and the Next control data set, the GUI controller 102 sends a changing instruction to the data controller 101. The panel controller 103 controls the control panel 104 to perform lighting and display of the control panel 104, and upon receipt of an operation input, communicates with the data controller 101, the device controller 100, and the vision mixer 105.

In response to an operation that the OnAir xpt button row of the control panel 104 has received or an operation that the Next xpt button row has received, the panel controller 103 sends an instruction to the vision mixer 105. At the same time, a result of that instruction is sent from the panel controller 103 to the data controller 101 to update a corresponding value in the OnAir control data set or the Next control data set.

Also with an operation received on an OnAir or Next M/E bank operating section of the control panel 104, besides the xpts, the panel controller 103 sends an instruction to the vision mixer 105, and sends a result of that instruction to the data controller 101 to update relevant data. In addition to that the vision mixer 105 is controlled, a corresponding value in the OnAir or Next control data set is updated. In this manner, control different from previously prepared contents can be exerted with good operability in a small panel surface area.

Upon receipt of a "take" trigger produced by an operation on the control panel 104 performed by an operator (user) from the panel controller 103, the device controller 100 sends a control signal that instructs start of a transition to to-be-controlled equipment such that an operating state concerning OnAir of the to-be-controlled equipment transitions to an operating state in accordance with the Next control data set.

With execution of the transition, the data controller 101 uses the contents of the Next control data set as a copy source to obtain contents of a new OnAir control data set, and instructs the GUI controller 102 to update the display. Note that, in the case of a configuration including a playlist, the contents of a set of Next control data are updated in accordance with a next set of control data in the playlist.

In response to an operation that the fader lever has received, the panel controller 103 sends an instruction to the vision mixer 105, and sends an instruction to the device controller 100. Then, the device controller 100 sends a control signal that instructs a transition to the to-be-controlled equipment so as to transition to an operating state in accordance with the Next control data set.

Figure 2:
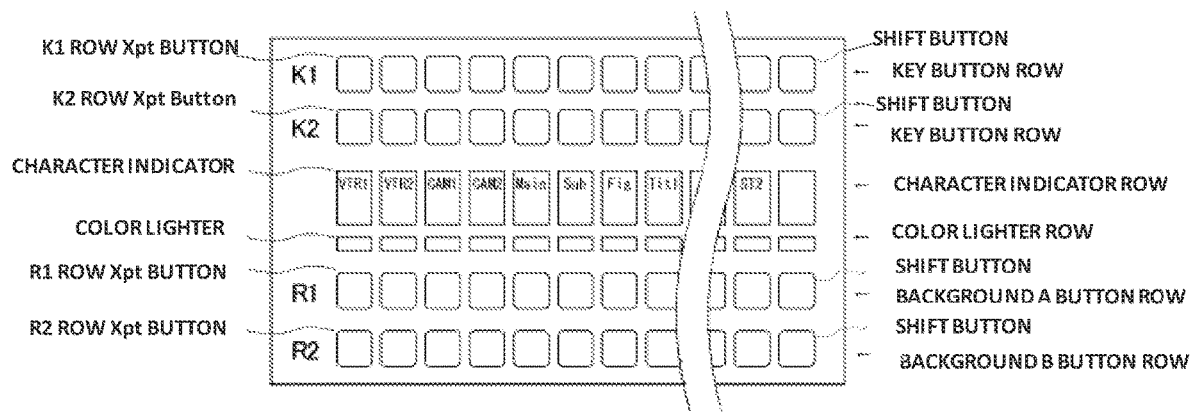
FIG. 2 is a diagram showing an example of a xpt button row arranged section which is one of modules to be structural elements of a control panel.
Figure 3:
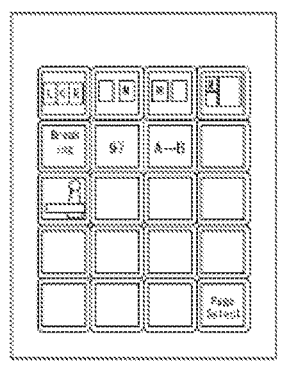
FIG. 3 is a diagram showing an example of a function assign button section (1) which is one of the modules to be structural elements of the control panel.
Figure 4:
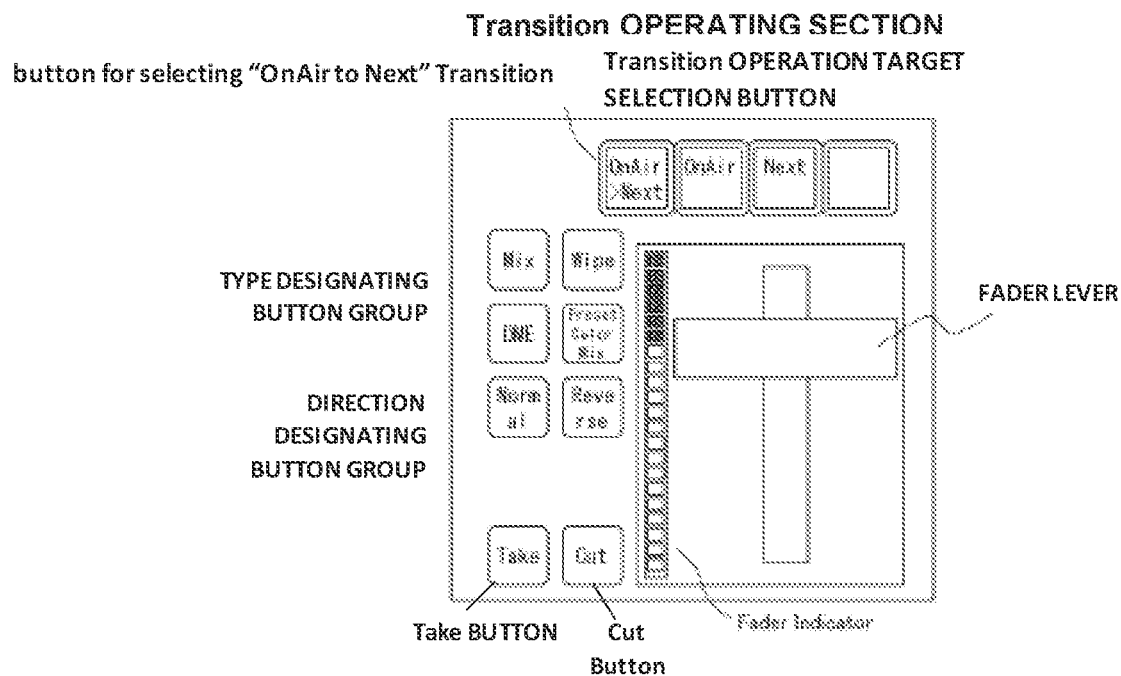
FIG. 4 is a diagram showing an example of a transition operating section which is one of the modules to be structural elements of the control panel.
Figure 5:
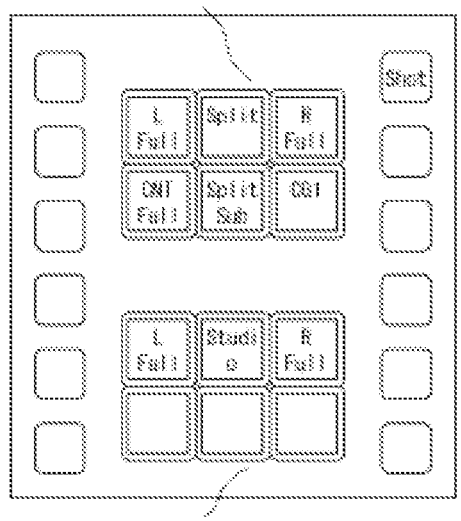
FIG. 5 is a diagram showing an example of a function assign button section (2) which is one of the modules to be structural elements of the control panel.
Figure 6:
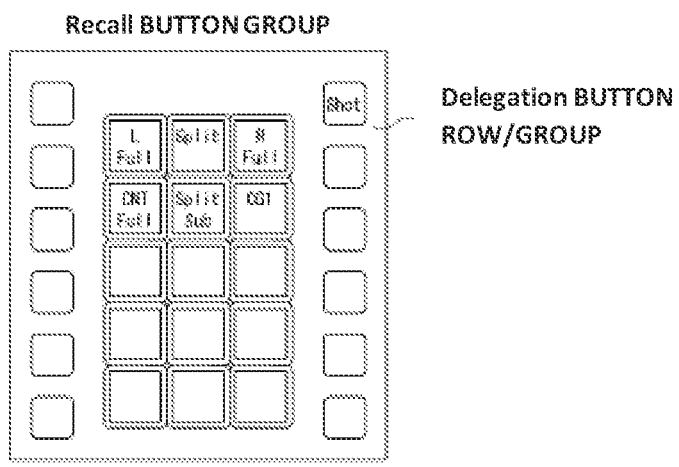
FIG. 6 is a diagram showing an example of a function assign button section (3) which is one of the modules to be structural elements of the control panel.

FIG. 2 to FIG. 6 show an example of modules to be structural elements of the control panel 104. FIG. 2 shows the xpt button row arranged section. FIG. 3 shows the function assign button section (1). FIG. 4 shows the transition operating section. FIG. 5 shows a function assign button section (2). FIG. 6 shows a function assign button section (3). By combining these modules, the control panel 104 of a planar, curved, or step-wise shape is formed.

Figure 7:
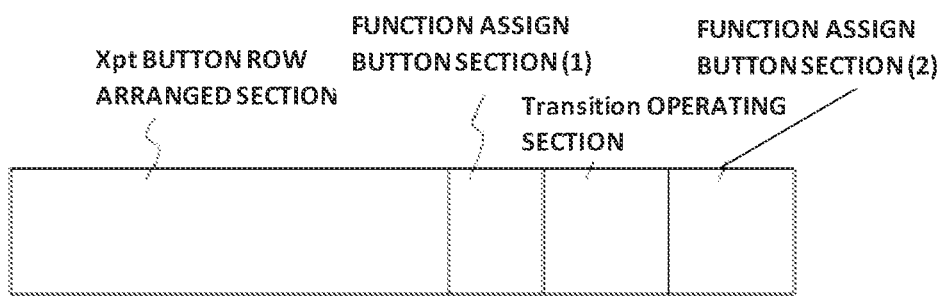
FIG. 7 is a diagram showing an exemplary configuration of the control panel.

FIG. 7 shows an exemplary configuration of the control panel 104. The operator operates to change xpt control contents of the vision mixer 105 of the OnAir control data and the Next control data through the xpt button row arranged section. At this time, in conjunction, a relevant xpt of the vision mixer 105 itself is controlled.

In the function assign button section (1), a Next recall button is arranged, and has the function of copying a set of control data (control data set) assigned to the Next recall button to the Next control data. When this copy is performed, control over the Next-specific signal processing section is also performed at the same time. Assignment to each Next recall button in the function assign button section (1) is included in the Next control data. Alternatively, as another example, assignment may be defined by another setting.

In addition to receiving an operation of transitioning from the state indicated by the current OnAir control data to the state indicated by the Next control data as shown in FIG. 4, the transition operating section receives an operation of a transition in M/E of the vision mixer 105 belonging to OnAir and a transition in M/E of the vision mixer 105 belonging to Next.

The OnAir recall button and the Next recall button are arranged in the function assign button section (2), which has the function of copying a set of control data (control data set) assigned to each of the buttons to the OnAir control control data or the Next control data. The OnAir recall button and the Next recall button are buttons each having a graphical indicator, to which one set of control data (control data set) in the control data set memory 112 is assigned as an option. Display contents to be displayed on the graphical indicator at that time are also included in the set of control data.

Figure 8:
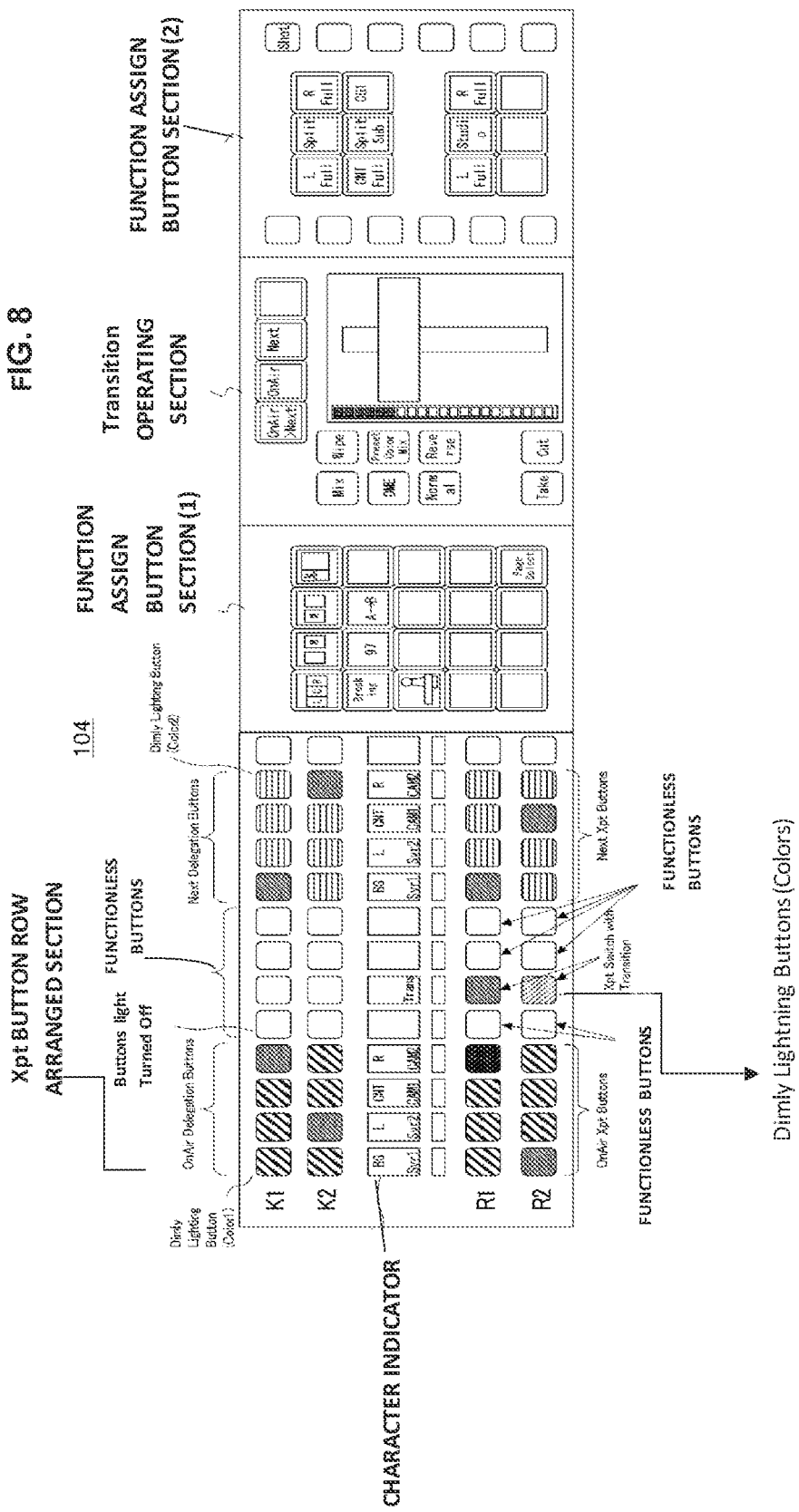
FIG. 8 is a diagram showing details of the exemplary configuration of the control panel.

FIG. 8 shows details of the exemplary configuration of the control panel 104 shown in FIG. 7. Delegation buttons in a K1 row or a K2 row are buttons for selecting a video element in an output scene to be targeted for a selection made by an operation received by a relevant button group (four each in the drawing) in an R1 row or an R2 row. The video element refers to the left sub-screen in two Picture-In-Pictures, for example, and in the vision mixer 105, corresponds to a certain bus (for example, a Key1). In addition, there is also a delegation function of determining a combination of two or more video signals in an output scene, for example, a background and a foreground (Key), as an option.

Buttons determined as xpt buttons in the R1 row or R2 row receive a designation operation of selecting and supplying one from input video signals or the like to an output video signal element instructed by delegation for each target bus. A setting of what is to be a target (video element) assigned to each of the delegation buttons is included in the OnAir control data regarding the OnAir delegation buttons, and the setting is included in the Next control data regarding the next delegation buttons.

Even if functionless buttons are pressed down, nothing happens. They are arranged to prevent an erroneous operation. To allow the operator to easily recognize functionless buttons, buttons other than the functionless buttons dimly light even in the unselected state. Buttons in the selected state brightly light (in accordance with the state). In addition, the color of dim lighting is set at a different color depending on the group of buttons, so that the operator can easily make a distinction. A button (xpt switch with transition setting button) for making a transition setting when pressing down a xpt button is an on/off toggle button, and when brought into an on state, switching (for example, a one-second mix transition) that takes a time, rather than cut switching, will be performed when pressing down a xpt button.

Figure 9:
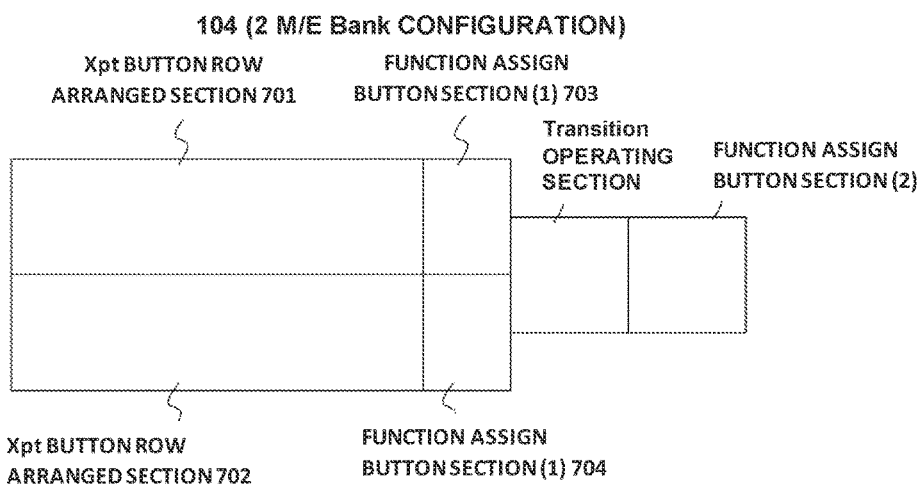
FIG. 9 is a diagram showing another exemplary configuration of a control panel.
Figure 10:
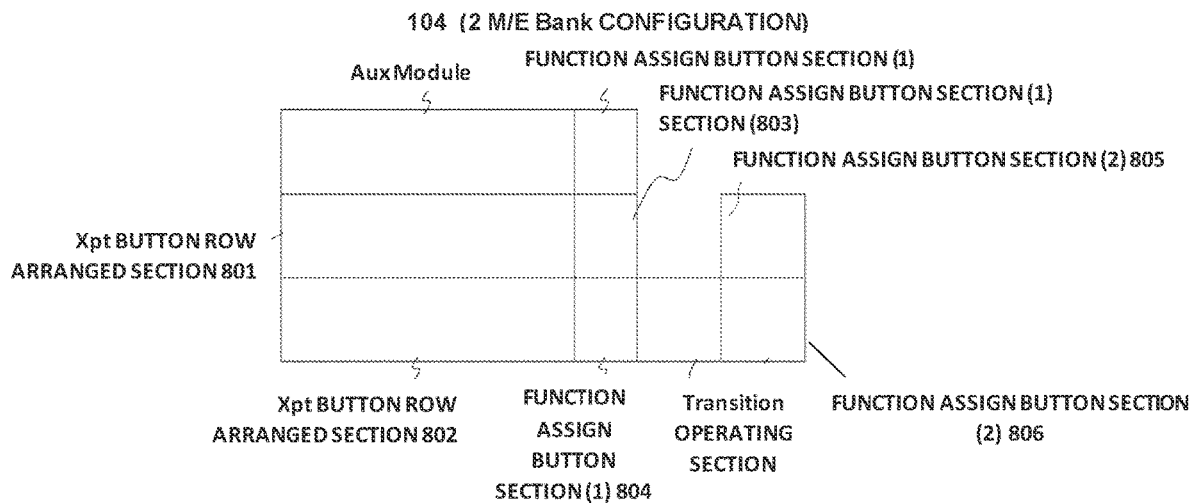
FIG. 10 is a diagram showing another exemplary configuration of a control panel.

FIG. 9 and FIG. 10 show other exemplary configurations of the control panel 104. In the example of FIG. 9, one of a xpt button arranged section 701 and a xpt button arranged section 702 is an OnAir-use xpt button arranged section (including OnAir delegation buttons, OnAir xpt buttons, and the like), and the other one is a Next-use xpt button arranged section (including next delegation buttons, Next xpt buttons, and the like). A function assign button section (1) 703 and a function assign button section (1) 704 adjacent to each other function as an OnAir recall button or a Next recall button in agreement with OnAir/Next of the respectively adjacent xpt button arranged sections.

In the example of FIG. 10, buttons concerning Next are arranged in a (xpt) button arranged section 801, a function assign button section (1) 803, and a function assign button section (2) 805, and buttons concerning OnAir are arranged in a (xpt) button arranged section 802, a function assign button section (1) 804, and a function assign button section (2) 806.

Figure 11:
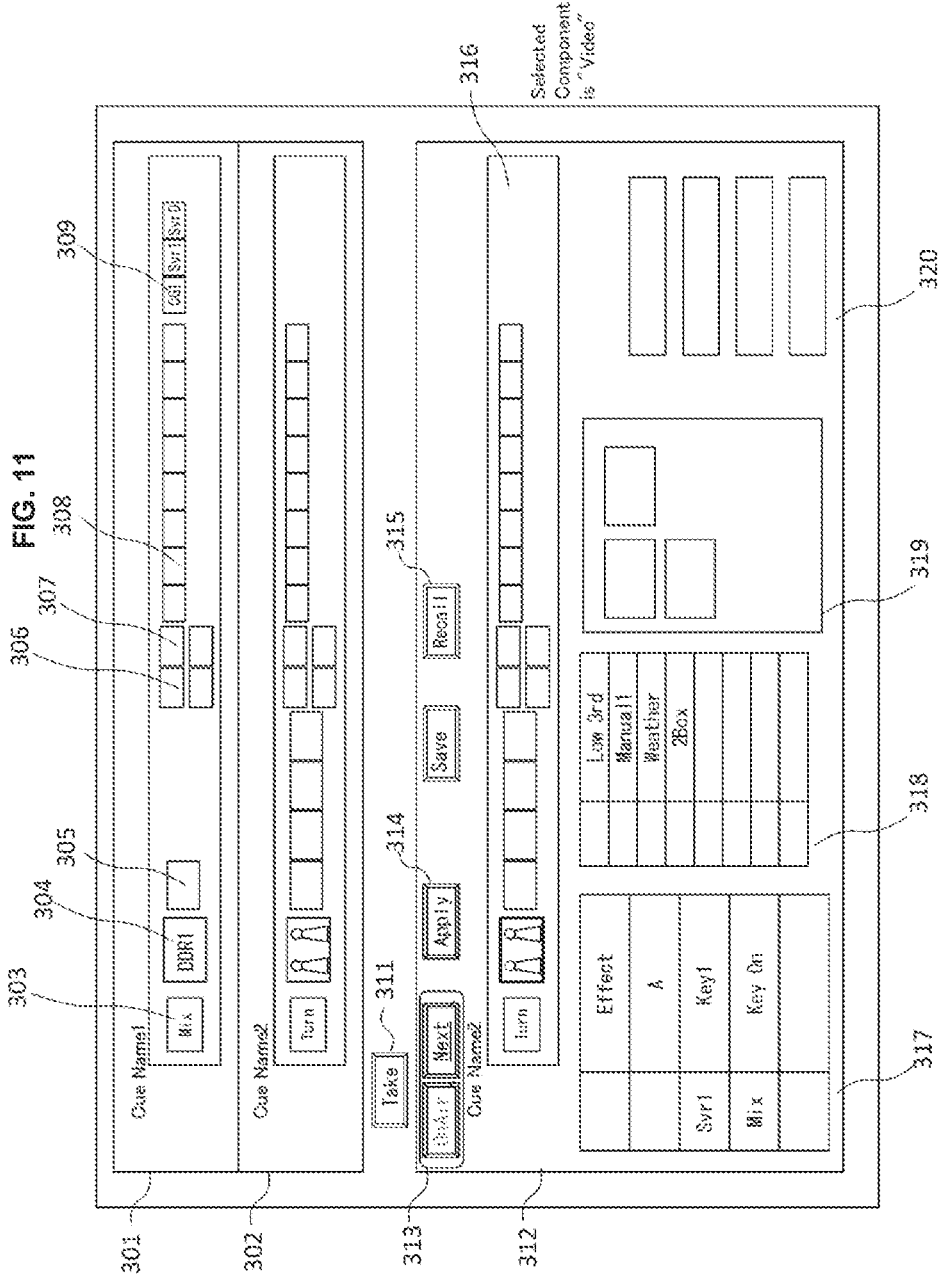
FIG. 11 is a diagram showing an example of a GUI display.

FIG. 11 shows an example of a GUI display. The operator (user) can make an operation input with the GUI, and can view an overview of a set of data with the GUI. In an OnAir setting display area 301, an overview of the OnAir control data is displayed. In a next setting display area 302, an overview of the Next control data is displayed.

At a transition setting icon 303, a method of causing video to transition when the control data is in Next and progress (Take) is made is displayed by an icon. At a video setting icon 304, an icon (for example, execution of PinP) of video signal processing is displayed. Note that, in the case where a video signal is merely passed and output without processing of PinP or the like, it will be an icon merely indicating a video signal source, rather than the icon of signal processing.

At a key setting icon 305, an icon of foreground superimposition processing for subtitles or the like is displayed in video signal processing. In the case where there are no relevant icons, relevant icons are not displayed in the OnAir and next setting display areas 301, 302. At a server setting icon 306, an icon of signal supply from a server is displayed. At a camera setting icon 307, an icon of camera control is displayed.

At an audio setting icon 308, an icon concerning control over the audio mixer 106 is displayed. At a studio monitor setting icon 309, an icon concerning control over studio monitor display is displayed.

For each icon, the operator sets such an icon that people easily understand visually, when creating control contents for each piece of to-be-controlled equipment that may be a part of a set of control data (control data set).

A take button 311 is a GUI for making an operation input of a Take. The take button 311 has the same function as the take button when "OnAir>Next" is selected in the transition operating section of the control panel 104 (see FIG. 4). A cue (control data set) edit display area 312 provides the function of changing the contents of a set of OnAir or Next control data (control data set). If a portion of corresponding to-be-controlled equipment exists, the changing contents are also reflected on that portion.

A cue select buttons 313 receive an alternative operation about which of OnAir and Next is to be targeted for changing. An apply button 314 receives an instruction operation of applying the changing operation. A recall button 315 has the function of opening another GUI screen (dialog), illustration of which is omitted, and provides the function of receiving an operation of selecting another stored set of control data (control data set) to copy the set to the changing target.

When an icon in a component select area 316 is clicked, the contents of control data (if it is the video setting icon, video signal processing contents) to which that icon relates becomes a target of editing. A GUI that receives an operation of displaying and editing the setting contents is displayed in an area below the component select area 316. The drawing shows an example where the video setting icon has been selected as an item.

An edit item (about the component) select area 317 lists and displays changeable elements among items so that a selection can be made. An item category select area 318 lists and displays folders that store control data for the type of items by a folder method so that a selection can be made.

An item setting select area 319 lists and displays control data for items in a folder selected in the item category select area 318 by icons so that a selection can be made. An item detail parameters setting area 320 is an area for setting details of an element selected in the edit item select area 317.

Note that, in the case where control by means of a playlist is performed, an overview of control data in the playlist is displayed in line, in addition to the OnAir control data and the Next control data.

Figure 12:
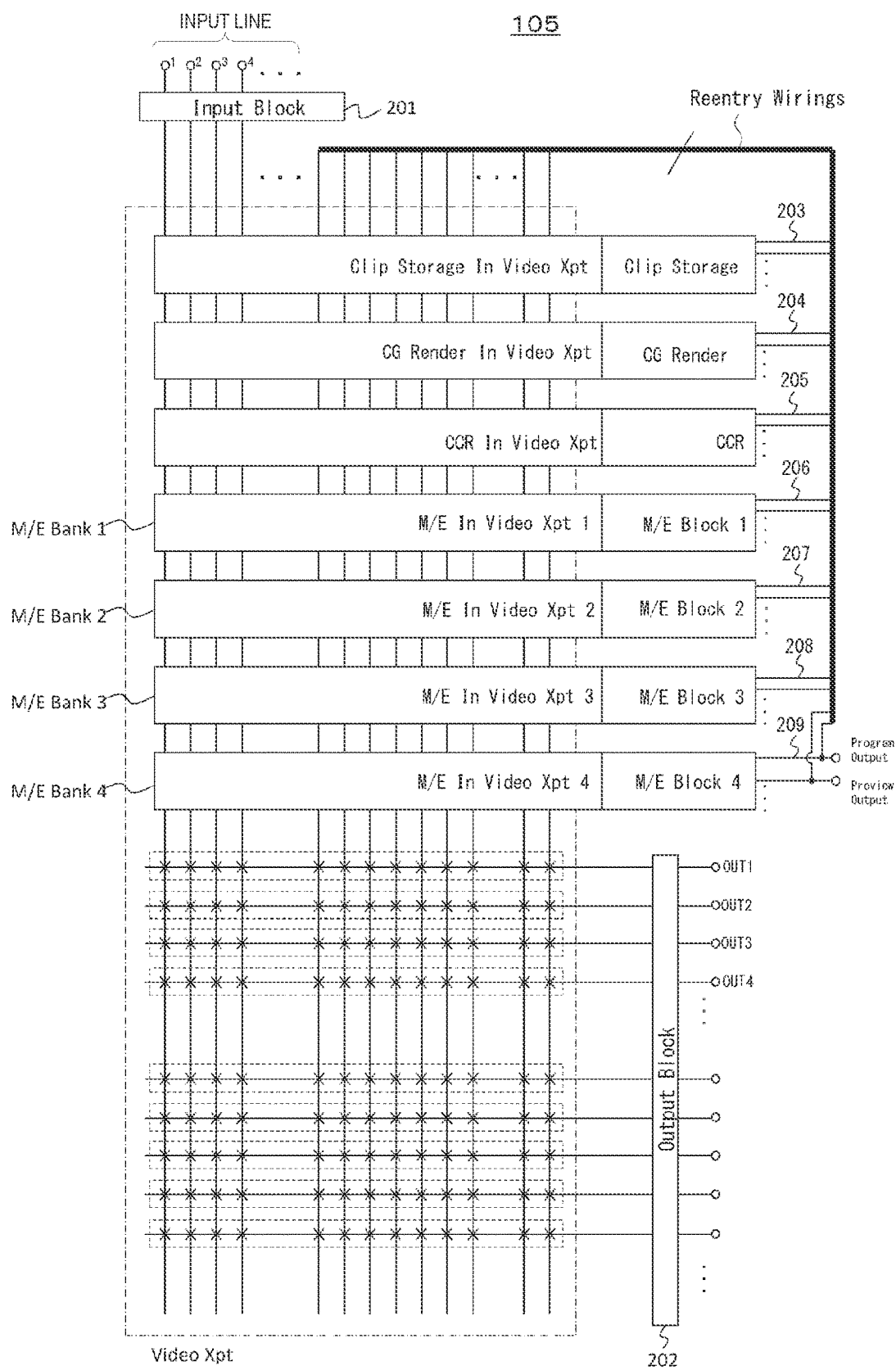
FIG. 12 is a block diagram in which the inside of a video mixing circuit of a vision mixer is seen in a video signal system.

FIG. 12 is a block diagram in which the inside of a video mixing circuit of the vision mixer 105 is seen in a video signal system. An input block 201 is a portion that receives a video signal obtained by a serial digital interface (SDI) video signal from a camera, or the like, and collectively shows a circuit that makes a delay adjustment for the video signal, a circuit for conversion into an internal format, and the like.

An output block 202 is a portion that outputs a video signal, and collectively shows a circuit that makes a delay adjustment for the video signal, a circuit that adds ancillary information, a circuit for format conversion into SDI or the like, and the like.

A portion surrounded by alternate long and short dashed lines indicates video xpts. In the illustrated state, video signals supplied from the upper side are indicated by vertical lines, and video signals supplied to the right are indicated by horizontal lines. At the places where a horizontal line and a vertical line overlap, there is an "x" mark, and indicates a selectable intersection point (xpt). Each of the horizontal lines, that is, each of internal buses has a selection function of selecting and receiving an input video signal indicated by any one of the vertical lines (see a laterally-extended broken line frame).

Note that, in each of rectangles of "ClipStorage In Video Xpt", "CG Render In Video Xpt", "CCR In Video Xpt", and "M/E In Video Xpt 1" to "M/E In Video Xpt 4", a plurality of internal buses exist although internal illustration is omitted, and each of the internal buses is controlled so as to receive any one input video signal. Control over them is controlled by a microcomputer in the vision mixer 105, for example.

The "ClipStorage" stores a video signal supplied via an internal bus from the "ClipStorage In Video Xpt", and outputs a stored video frame (one or a string) via a plurality of output buses 203.

The "CG Render" is a circuit that performs computer graphics processing, and utilizing a video signal supplied via an internal bus from the "CG Render In Video Xpt", generates a computer graphics video signal in synchronization with a reference signal for output via a plurality of output buses 204.

The "CCR" is a color correction circuit, and makes a color adjustment for a video signal supplied via an internal bus from "CCR In Video Xpt" for output via a plurality of output buses 205. A delay in this "CCR" is less than a time of a scanning line.

The "M/E Block 1" to "M/E Block 4" respectively process video signals supplied via internal buses from "M/E In Video Xpt 1" to "M/E In Video Xpt 4" belonging to the "M/E Block 1" to "M/E Block 4", respectively, for output via a plurality of output buses 206 to 209 belonging to the "M/E Block 1" to "M/E Block 4", respectively. Details of the M/E blocks ("M/E Block 1" to "M/E Block 4") will be described later.

The "Reentry Wirings" collectively indicate a circuit configuration in which video signals from the respective blocks via a respective plurality of the output buses 203 to 209 (partly omitted from the illustration) are respectively routed as inputs to the video xpts. OUT1, OUT2, ... indicate output ports to the outside, and each one of them is a line that outputs a video signal.

Figure 13:
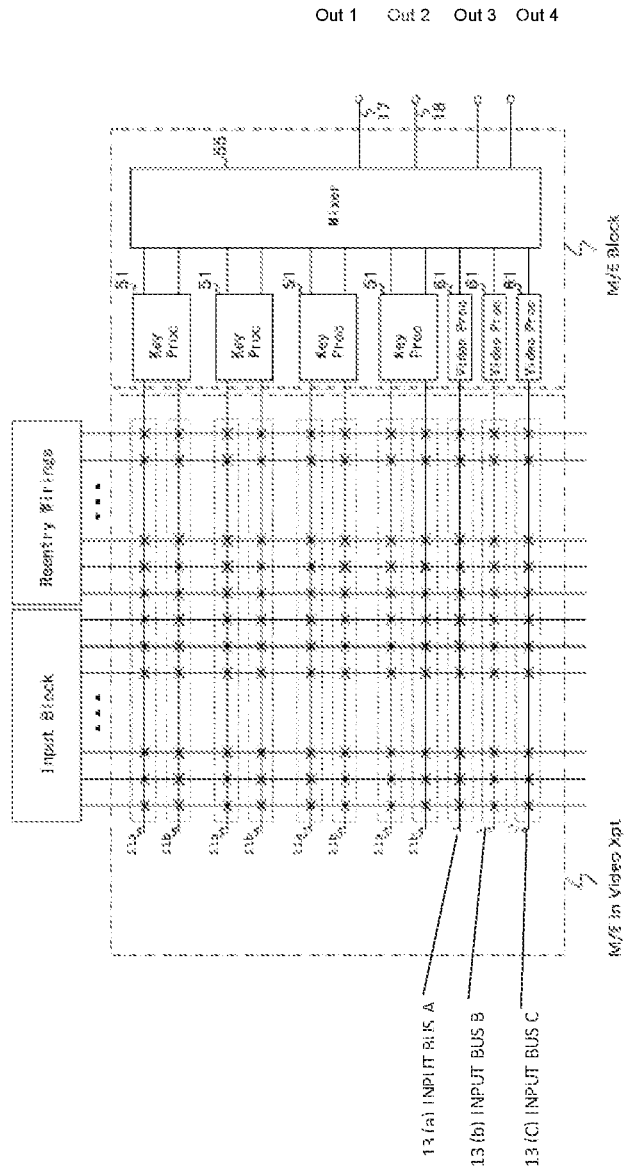
FIG. 13 is a diagram showing an exemplary configuration of an M/E bank.

FIG. 13 shows an exemplary configuration of an M/E bank. The M/E bank includes a video xpt (M/E In Video Xpt) and an M/E block. The M/E block is a circuit block that performs video image synthesis. This M/E block includes a plurality of key processors (key image processing sections), four key processors 51 herein, a mixer (synthesis processing section) 55, and a plurality of video processors (video processing sections), three video processors 61 herein. The key processors 51 and the mixer 55 form a superimpose circuit.

The video xpt is an input selecting section, and supplies each input video signal selectively to four pairs of a key source bus 11a and a key fill bus 11b, a background A bus 13a, a background B bus 13b, and an auxiliary input bus 14. A key fill signal of the key fill bus 11b is a signal of an image to be superimposed as the foreground on a background image, and a key source signal of the key source bus 11a is a signal that designates a region where the key fill signal is to be superimposed, the shape in which the background image is cut out, the concentration of the key fill signal with respect to the background image, or the like.

A background A signal taken out to the background A bus 13a is sent to the mixer 55 via the video processor 61. In addition, a background B signal taken out to the background B bus 13b is sent to the mixer 55 via the video processor 61. In addition, an auxiliary input signal taken out to the auxiliary input bus 14 is sent to the mixer 55 via the video processor 61.

The key processor 51 is a circuit that adjusts and processes a key fill signal and a key source signal so as to be suited to keying on the basis of key adjustment values which are various parameters for performing keying. The key adjustment values are values as indicated below. That is, a value that adjusts the concentration of a key fill signal with respect to a background image, a value that adjusts a threshold value of a signal level of an image to be determined as a key source signal, a value that adjusts the position of the key source signal, a value that adjusts the reduction ratio of the key fill signal, an adjustment value concerning the boundary with the background image, and the like are included.

The key fill signal and the key source signal adjusted and processed by the key processor 51 are sent to the mixer 55. The mixer 55 is a circuit that superimposes a foreground image on a background image by keying using the key fill signal and the key source signal from the key processor 51. In addition, the mixer 55 is capable of synthesizing the background A signal having passed through the video processor 61 and the background B signal having passed through the video processor 61 into a background image, and using wipe for this synthesis, and has the function of performing switching transition of a background image by wipe or the like.

From this mixer 55, a program output is output to the outside through a program output line 17. In addition, from this mixer 55, a preview output is output to the outside through a preview output line 18. Outputs of the mixer 55 are shown in four systems, whilst there are more signals that can be output from the inside of the mixer 55, and which signal to be selected and output from the inside of the mixer is determined by a separate setting. Herein, it is set that at least a program (a video signal of a main synthesis result) and a preview are output.

Note that each signal processing function of the M/E bank may be configured to be implemented by a computer/software.

Figure 14:
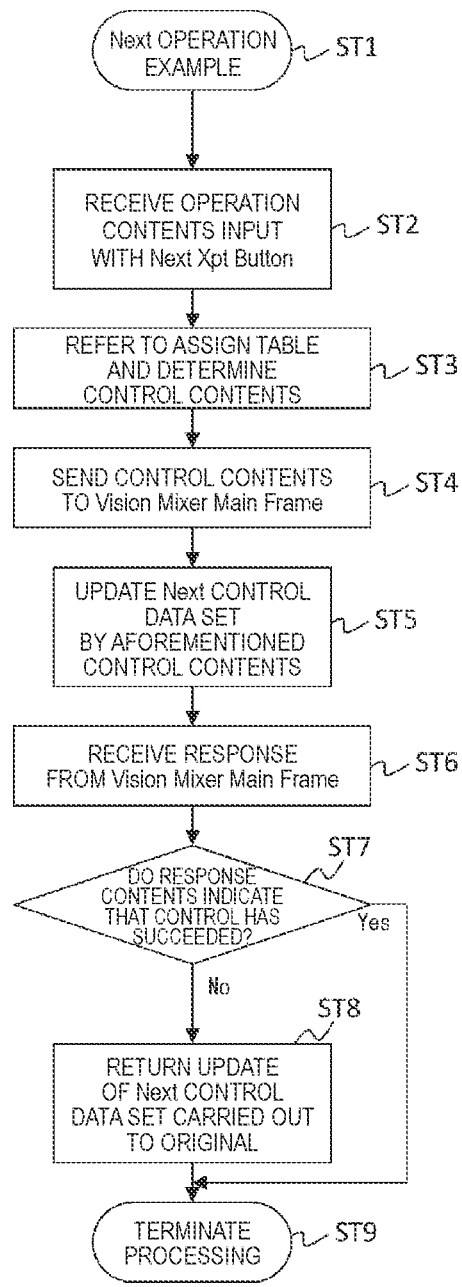
FIG. 14 is a flowchart showing an example of an operation of a panel controller and a data controller when a Next xpt button of the control panel is pressed down.
Figure 15:
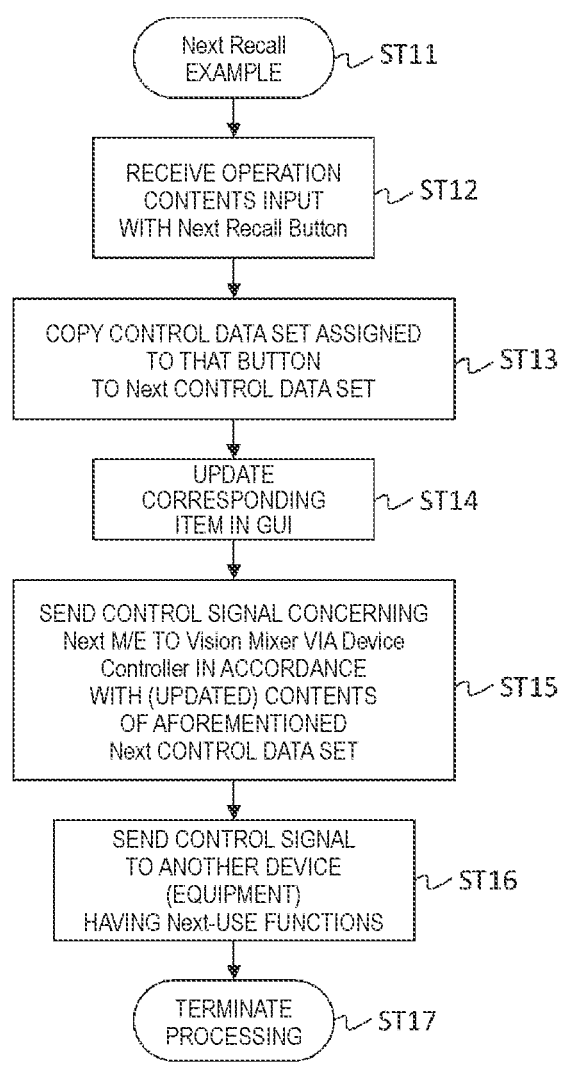
FIG. 15 is a flowchart showing an example of an operation of the panel controller and the data controller when a Next recall button of the control panel is pressed down.

Flowcharts of FIG. 14 and FIG. 15 show an example of operations of the panel controller 103 and the data controller 101 (hereinafter, herein simply referred to as a "controller").

FIG. 14 shows an operation when the Next xpt button of the control panel 104 as shown in FIG. 8 is pressed down. In step ST1, the controller starts processing. Then, in step ST2, the controller receives operation contents input with the Next xpt button.

Next, in step ST3, the controller refers to an assign table, and determines control contents. Then, in step ST4, the controller sends the control contents to the vision mixer 105. Next, in step ST5, the controller updates the Next control data set by the control contents.

Next, in step ST6, the controller receives a response from the vision mixer 105. Then, in step ST7, the controller determines whether the response contents indicate that control has succeeded. When control has not succeeded, in step ST8, the controller returns update of the Next control data set carried out in step ST5, and thereafter, terminates the processing in step ST9. On the other hand, when control has succeeded, the controller immediately terminates the processing in step ST9.

FIG. 15 shows an operation when the Next recall button of the control panel 104 as shown in FIG. 8 is pressed down. In step ST11, the controller starts processing. Then, in step ST12, the controller receives operation contents input with the Next recall button.

Next, in step ST13, the controller copies a control data set assigned to that button to the Next control data set. Then, in step ST14, the controller updates a corresponding item in the GUI.

Next, in step ST15, the controller sends a control signal concerning the Next-use M/E to the device controller 100 in accordance with (updated) contents of the Next control data set. Then, in step ST16, the controller sends a control signal to another device (equipment) having Next-use functions. Thereafter, the controller terminates the processing in step ST17.

Referring back to FIG. 1, the respective controllers cooperate to achieve control over the UI of the studio equipment control system 10 and the to-be-controlled equipment.

Besides, the respective controllers cooperate to achieve control over the UI of the present system and the to-be-controlled equipment. A newsroom computer system 111 exerts control over a server called the playout server 110 or the like in conjunction with the data controller 101. Conjunction contents are included in a set of control data (control data set). Communication between the newsroom computer system 111 and the data controller 101 is performed by a media object servers (MOS) protocol or the like, for example.

As described above, in the present technology, while achieving control over many pieces of to-be-controlled equipment, some types of processing of some pieces of equipment can be temporarily changed by a manual operation.

Hereinafter, variations and details of each section (each piece of equipment) will be further described.

"Audio Mixer Control"

Audio mixer control contents of the Next control data set can be checked by the GUI (see FIG. 11). Next may be selected with the cue select buttons 313, and an audio selection icon may be selected in the component select area 316. The contents are displayed below the component select area 316. The same applies to another type of to-be-controlled equipment.

The output audio according to the audio mixer control contents of the Next control data set can be monitored by designating "Audio Preview" by a dedicated headphone output or switching type audio output from the audio mixer 106.

"Vision Mixer Direct Operation Mode"

The xpt button row arranged section (see FIG. 2) can make switching to a vision mixer direct operation mode as an operation mode, in addition to the above-described normal operation. This mode provides the same operation environment as a control panel of a known conventional vision mixer. Which mode is to be selected can be set through the GUI (illustration omitted), or a button in the function assign button section may be provided with a switching function.

As preparation work, when creating vision mixer control data in a set of control data (control data set) before the start of operation, the vision mixer direct operation mode is useful. In the vision mixer direct operation mode, a light emission status, for example, the color or the like of the panel surface around each xpt button row may be changed, or the dim lighting status of buttons in each xpt button row may be changed to visually indicate that it is a special mode. For a light emission mechanism of the panel surface, by covering the surface of the panel surface with a translucent plate, and separating regions to arrange the light emission mechanism, for example, light emission of only a portion in the surface is also possible.

In the vision mixer direct operation mode, there are
Button Row 1 for keyer 1 in default
Button Row 2 for keyer 2 in default
Display Row
Button Row 3 for Bkgd A in default
Button Row 4 for Bkgd B in default.

In addition, some of the respective buttons in the function assign button section (1) (see FIG. 3) are buttons for changing the functions of the respective rows in the xpt button row arranged section. Among them, there is a button called a "Key Src" button. The "Key Src" button is a button that brings about an operating state in which a key source side signal assigned to each xpt button is selected only while the "Key Src" button is being pressed down, or as another example, by pressing down the xpt button with a press-down toggle.

While this "Key Src" button is being pressed down, a character indicator in the "Display Row" displays the name of a signal on the key source side assigned to each xpt button. This name display on the key source side is displayed with some changed color relative to other times for easy understanding that it is a special state.

Figure 16:
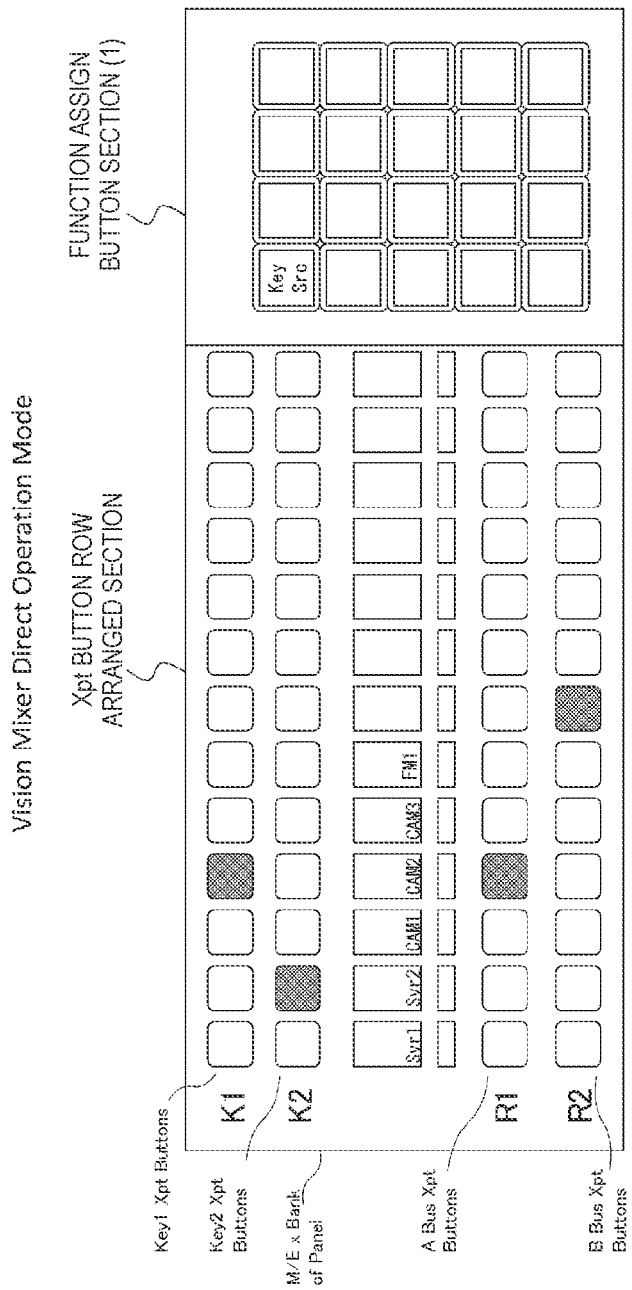
FIG. 16 is a diagram showing an example of a state of the xpt button row arranged section in the case where a "Key Src" button has not been pressed down in a vision mixer direct operation mode.
Figure 17:
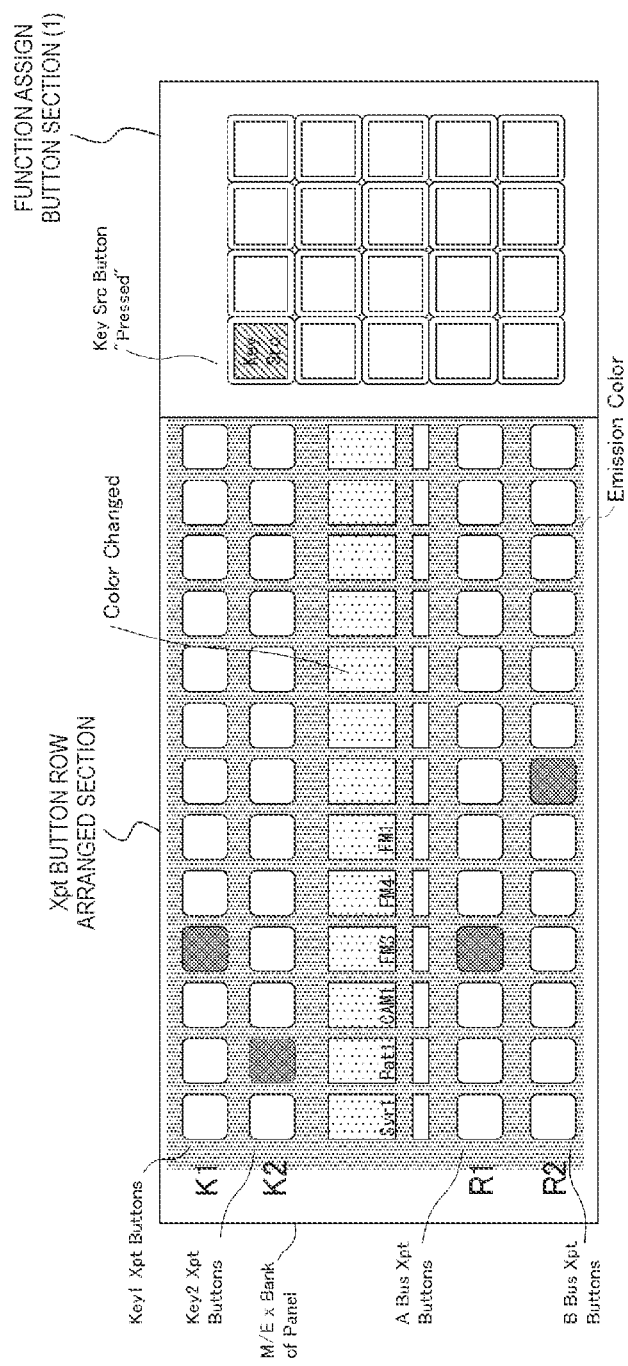
FIG. 17 is a diagram showing an example of a state of the xpt button row arranged section in the case where the "Key Src" button has been pressed down in the vision mixer direct operation mode.

This manner of changing the color includes a change of the color of characters of the indicator, a change of the color of the background of characters, a change of luminance, and the like, and further alternatively, the light emission status of the panel surface around the indicator row and each xpt button row may be changed. FIG. 16 shows an example of a state in the case where the "Key Src" button has not been pressed down in the vision mixer direct operation mode, and FIG. 17 shows an example of a state in the case where the "Key Src" button has been pressed down in the vision mixer direct operation mode.

Figure 18:
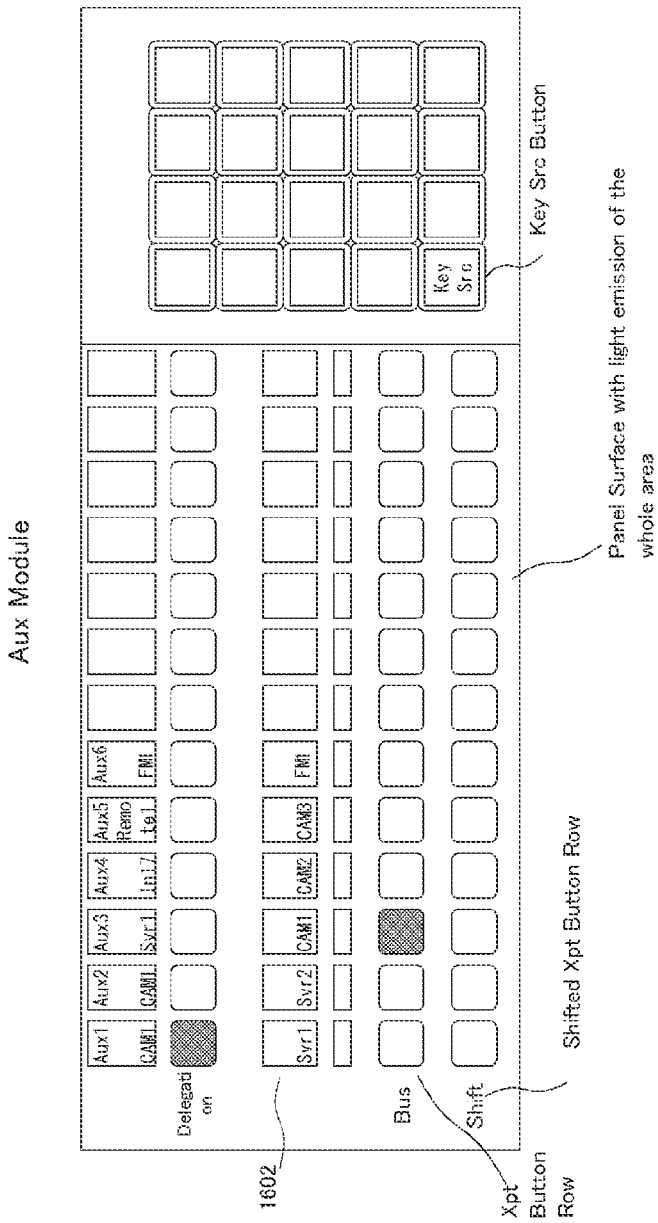
FIG. 18 is a diagram for describing providing the "Key Src" button for an auxiliary module.

Note that, as shown in FIG. 18, the "Key Src" button may also be provided for an auxiliary module (aux module). In the illustrated example, an assignable indicator-equipped button is the "Key Src" button. While the "Key Src" button is being pressed down, or while the on/off toggle is on, the key source side can be selected with a xpt button of the auxiliary module. While this "Key Src" button is being pressed down, a character indicator 1602 in the "Display Row" of the auxiliary module displays the name of a signal on the key source side assigned to each xpt.

Figure 19:
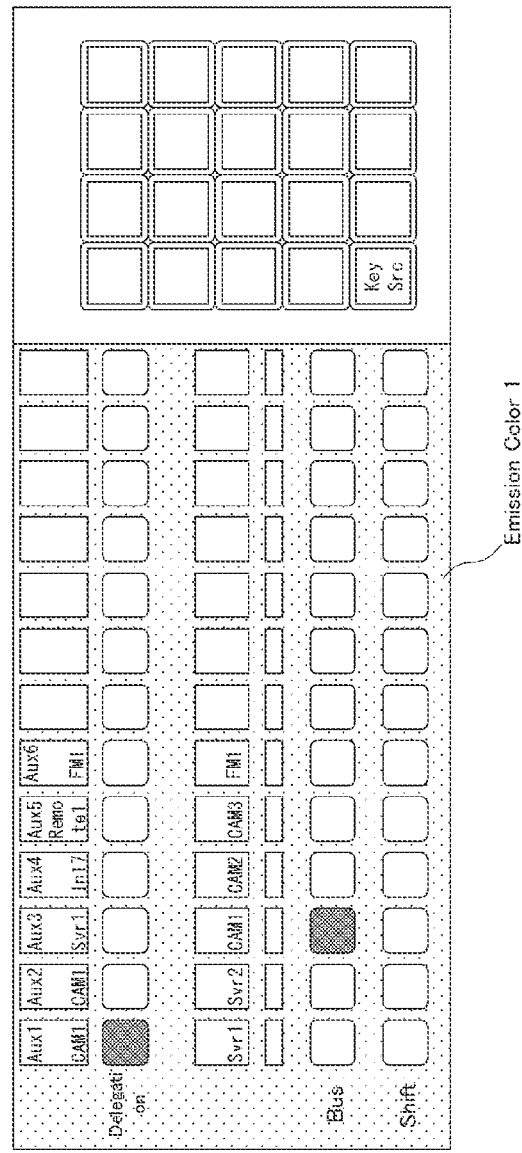
FIG. 19 is a diagram showing an example of a light emission status of a panel surface in the case where the "Key Src" button has not been pressed down.
Figure 20:
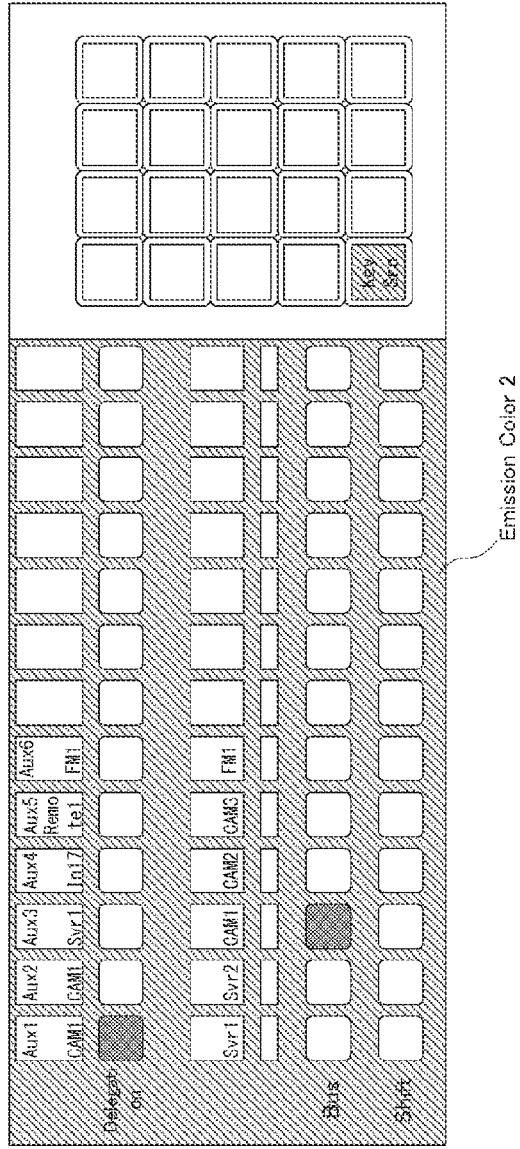
FIG. 20 is a diagram showing an example of the light emission status of the panel surface in the case where the "Key Src" button has been pressed down.

On that occasion, the light emission status of the panel surface may be changed. FIG. 19 shows an example of the light emission status in the case where the "Key Src" button has not been pressed down. In this case, the panel surface is in a first color (emission color 1). FIG. 20 shows an example (Example 1) of the light emission status in the case where the "Key Src" button has been pressed down. In this case, the panel surface is in a second color (emission color 2).

Figure 21:
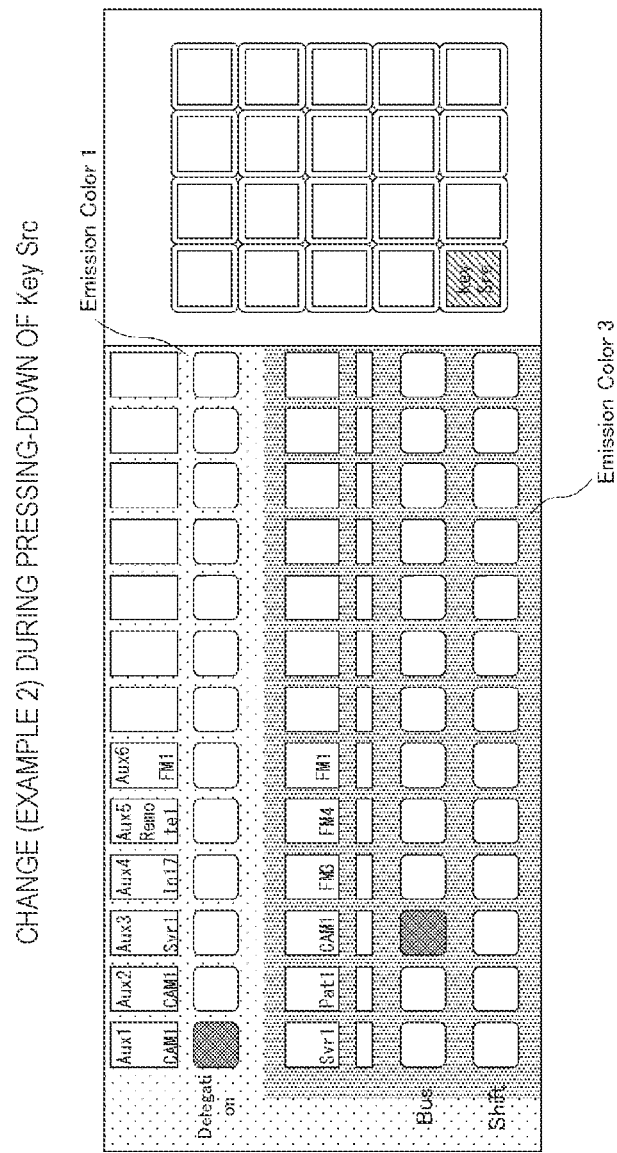
FIG. 21 is a diagram showing another example of the light emission status of the panel surface in the case where the "Key Src" button has been pressed down.

FIG. 21 shows another example (Example 2) of the light emission status in the case where the "Key Src" button has been pressed down. In this case, in the panel surface, the surroundings of each xpt button row are in a third color (emission color 3), and the remaining panel surface remains in the first color (emission color 1). Note that such changes in light emission status can be applied not only to the "Key Src" button function, but also to the case where a function assigned to a button group of the panel is temporarily changed by pressing down another button.

"Bank toggle and bank tally"

FIG. 22 to FIG. 25 and FIGS. 26A, 26B, and 26C are diagrams showing examples of changes in lighting/display status of the control panel 104 when, on the control panel 104 including the OnAir-use xpt button arranged section and the Next-use xpt button arranged section as shown in FIG. 9 and FIG. 10, a Take causes the OnAir state to transition to the state of a set of Next control data (Next control data set). It is shown by an example where a playlist is not used.

[Toggle On]

Figure 22:
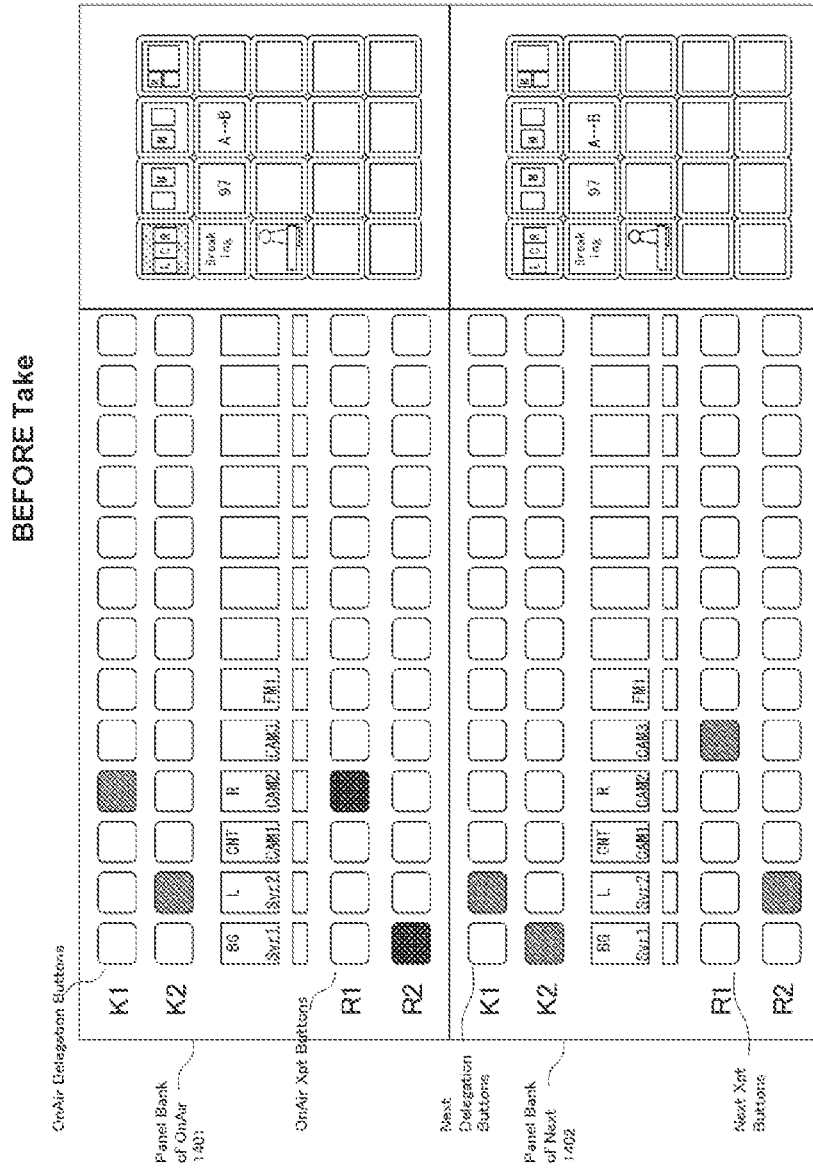
FIG. 22 is a diagram showing an example (before a Take) of a change in lighting/display status of the control panel when an OnAir state transitions to the state of the Next control data set by a Take.
Figure 23:
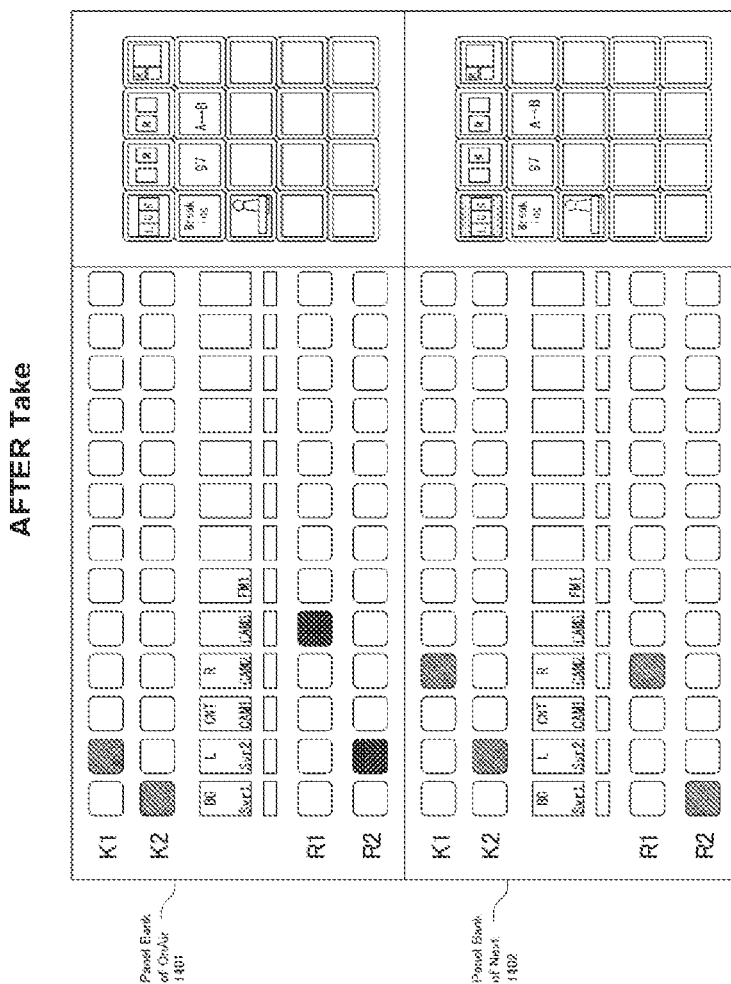
FIG. 23 is a diagram showing an example (after a Take) of a change in lighting/display status of the control panel when the OnAir state transitions to the state of the Next control data set by a Take.

FIG. 22 and FIG. 23 show, as Example 1, a change in display status before and after a Take in an example "Toggle On/Flip-flop Mode" where the OnAir-use xpt button arranged section is always assigned to the same module on the control panel 104.

FIG. 22 is an illustration of display status before the Take, and a portion 1401 is a portion that receives a state display and an operation concerning OnAir, and a portion 1402 is a portion that receives a state display and an operation concerning Next. Lighting buttons (having been selected) in the R1 row and the R2 row in the portion 1401 are lighting red (shown in black in the drawing). This indicates a state being used for OnAir.

The function assign button section on the right side in the portion 1401 is an OnAir recall button group that recalls a set of control data (control data set) from OnAir. The function assign button section in the portion 1402 is a Next recall button group that recalls a set of control data (control data set) for Next.

FIG. 23 is an illustration of a display status after the Take. Role assignment to each panel module is similar to FIG. 22, and the portion 1401 is a portion that receives a state display and an operation concerning OnAir, and the portion 1402 is a portion that receives a state display and an operation concerning Next. Lighting buttons (having been selected) in the R1 row and the R2 row in the portion 1401 are lighting red (shown in black in the drawing). This indicates a state being used for OnAir. Except them, since a set of Next control data (Next control data set) has been copied to the OnAir control data by the Take, the lighting state of the portion 1401 in FIG. 23 is the same as the lighting state of the portion 1402 in FIG. 22.

Note that, since a playlist is not used in this example, the portion 1402 in FIG. 23 (after the transition), that is, the Next state, is the same as the OnAir state before the transition. Thus, except the red lighting color, the lighting state has interchanged between the portion 1401 and the portion 1402 by the Take in the appearance of the control panel. That is, control is exerted such that the button row having been the Next xpt button row before a transition functions as the OnAir xpt button row after the transition. The same applies to other buttons in the same row.

[Toggle Off]

Figure 24:
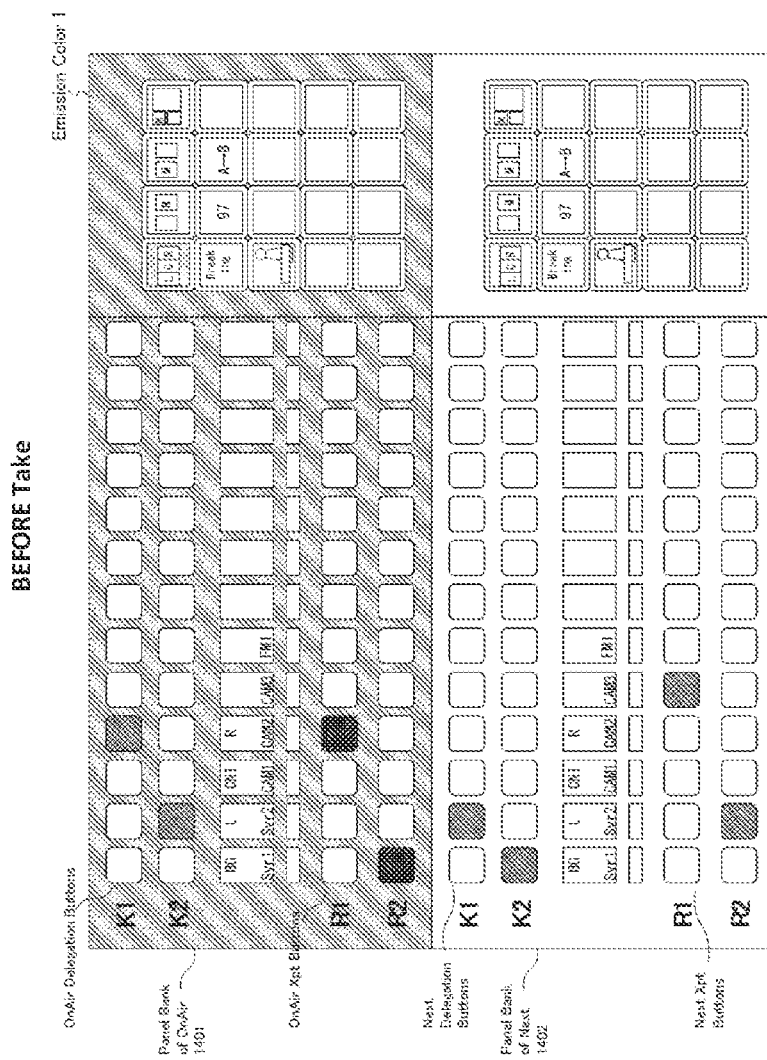
FIG. 24 is a diagram showing an example (before a Take) of a change in lighting/display status of the control panel when an OnAir state transitions to the state of the Next control data set by a Take.
Figure 25:
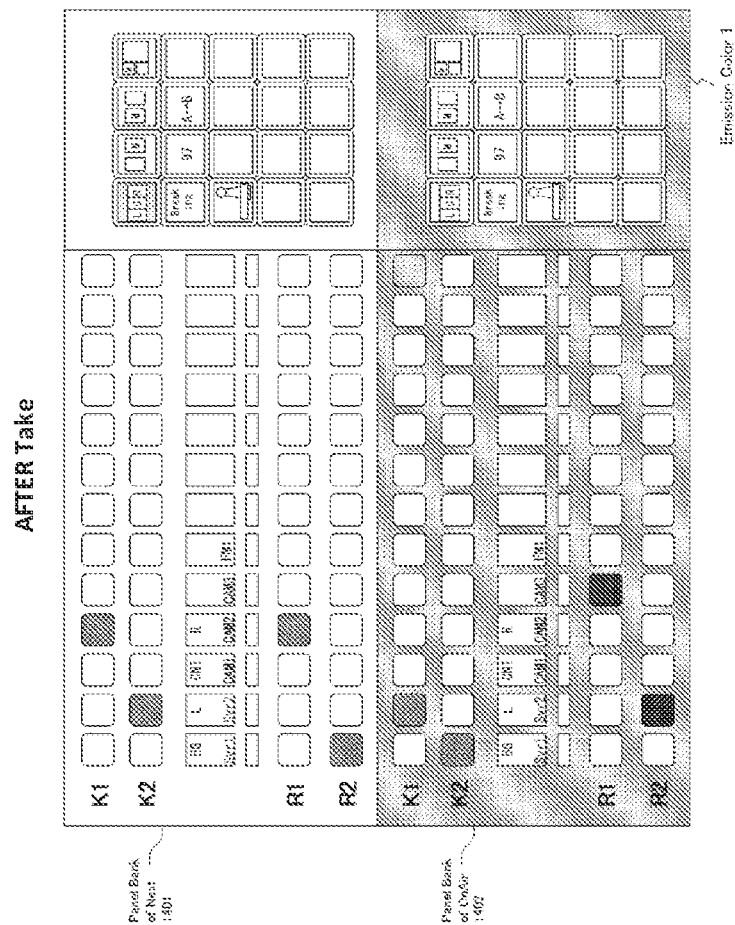
FIG. 25 is a diagram showing an example (after a Take) of a change in lighting/display status of the control panel when the OnAir state transitions to the state of the Next control data set by a Take.

FIG. 24 and FIG. 25 show, as Example 2, a change in display status before and after a Take in an example (toggle off/non flip-flop mode) of causing the OnAir-use xpt button arranged section on the control panel 104 to be assigned to a different module depending on a Take.

FIG. 24 is an illustration of a display status before the Take, and is similar to FIG. 22. FIG. 25 is an illustration of a display status after the Take. The role assignment of each panel module is different from FIG. 24, and the portion 1401 is a portion that receives a state display and an operation concerning Next, and the portion 1402 is a portion that receives a state display and an operation concerning OnAir. Lighting buttons (having been selected) in the R1 row and the R2 row in the portion 1402 are lighting red (shown in black in the drawing). This shows a state being used for OnAir. Except them, since a panel module corresponding to Next and a panel module corresponding to OnAir have interchanged by the Take, the lighting state of the portion 1402 in FIG. 25 is the same as the lighting state of the portion 1402 in FIG. 22.

In FIG. 24, on the panel surface in the portion 1401, a surface portion excluding buttons and indicators is emitting light. In FIG. 25, the panel surface in the portion 1401 does not emit light, and the panel surface in the portion 1402 is emitting light. With such a change in light emission part, the operator can easily grasp which portion (panel module) is for OnAir, and is less likely to operate an operation target while mixing up OnAir and Next.

Note that, by making the emission color of this portion 1401 and the portion 1402 the same as the area color of the OnAir setting display area 301 and the Next setting display area 302 in a GUI as in FIG. 11 so as to have the same color for OnAir and the same color for Next, an operation environment for the operator to easily understand the correspondence to the GUI is obtained.

Figure 26A:
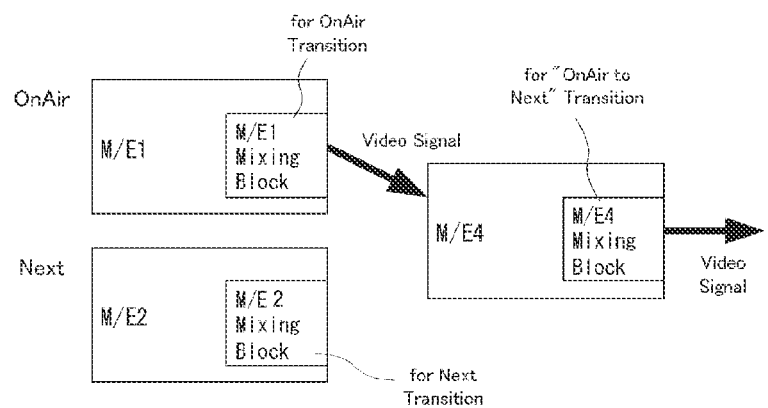
FIGS. 26A, 26B, and 26C are diagrams showing how usage of M/E of the vision mixer transitions by a Take.
Figure 26C:
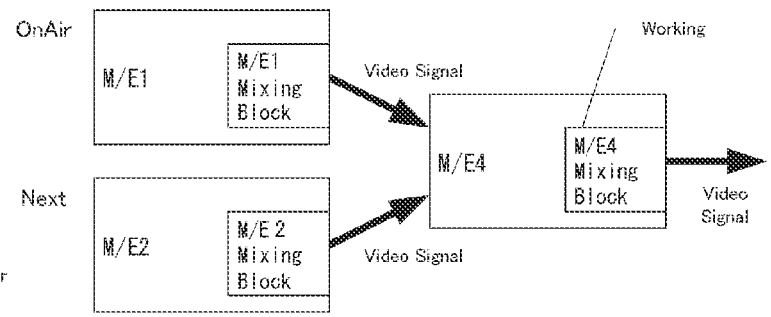
Figure 26B:
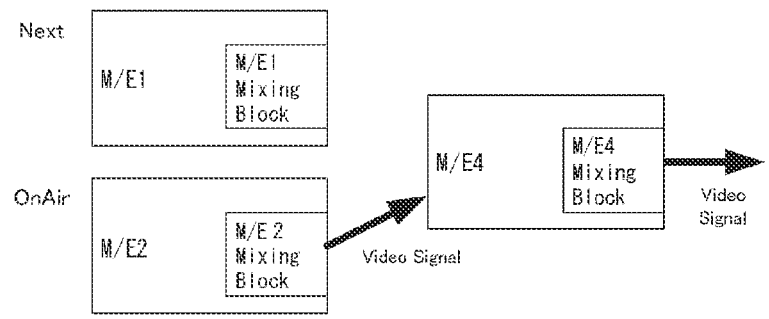

FIGS. 26A, 26B, and 26C show how usage of the M/E block of the vision mixer (Vision Mixer Mainframe) transitions by a Take. FIG. 26A shows an initial state. An OnAir-use video signal is generated in M/E1, and output via M/E4. In addition, a Next-use video signal is generated in M/E2.

FIG. 26C shows a transient state of switching. During switching from OnAir to Next, video signals from both M/E1 and M/E2 are supplied, and synthesized in M/E4 for output. FIG. 26B shows a state after switching. An OnAir-use video signal is generated in M/E2, and output via M/E4. In addition, a Next-use video signal is generated in M/E1.

A panel module equipped with a fader lever is not included in FIG. 22 to FIG. 25, whilst various modules such as a panel module equipped with a fader lever for operations on the OnAir-use M/E and the Next-use M/E may be included in each row.

Figure 27:
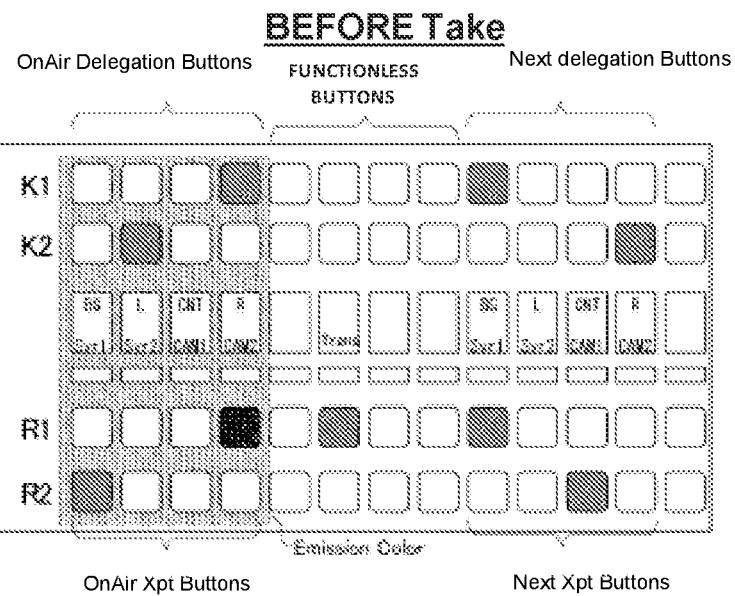
FIG. 27 shows a lighting state before a Take on the panel surface of a configuration divided laterally to be separated into an OnAir-use and a Next-use.
Figure 28:
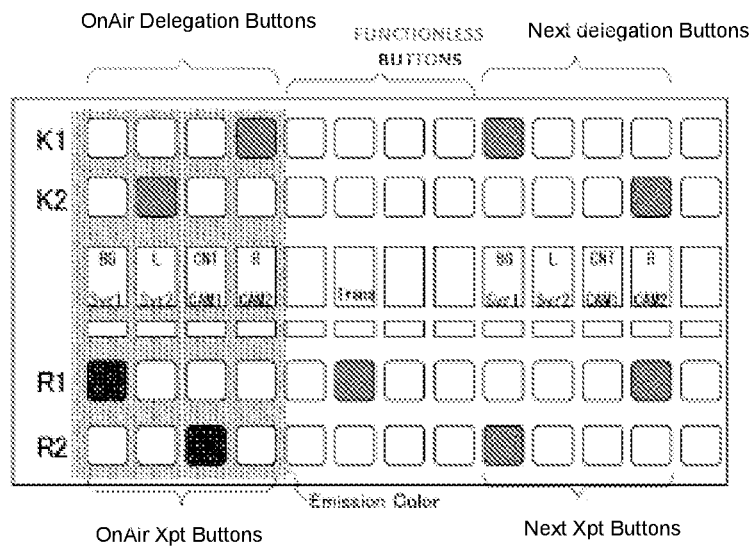
FIG. 28 shows a lighting state after a Take of a toggle on setting on the panel surface of the configuration divided laterally to be separated into the OnAir-use and the Next-use.
Figure 29:
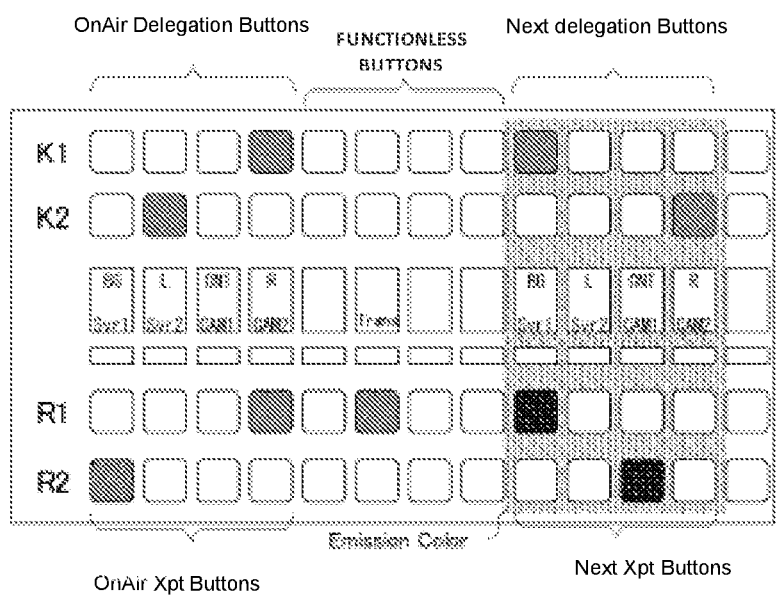
FIG. 29 shows a lighting state after a Take of a toggle off setting on the panel surface of a configuration divided laterally to be separated into the OnAir-use and the Next-use.

In addition, FIG. 22 to FIG. 25 show examples where rows on the panel are divided into the OnAir-use and the Next-use, whilst even to the panel surface of a configuration divided laterally to be separated into the OnAir-use and the Next-use as in FIG. 8, similar (two types of) behaviors can be applied. FIG. 27 to FIG. 29 show its example. FIG. 27 shows before a Take, FIG. 28 shows a toggle on setting after the Take, and FIG. 29 shows a lighting status in a toggle off setting after the Take.

In the foregoing, an operation without using a playlist has been described, whilst in the case of a system operation through use of a playlist, contents of a row or portion of the panel module on the Next side after a transition will be in accordance with a next set of control data (control data set) in a permutation that the playlist has.

"Bus Tally"

The M/E of the vision mixer 105 has an operation setting of alternately using an A bus and a B bus as a source of M/E output by a transition. This operation setting is called a bus toggle off setting. In the vision mixer direct operation mode, which of the A bus and the B bus is used as a source of a video signal of the M/E output in the case of the bus toggle off setting can be indicated by the color of dim lighting of buttons other than a selected xpt button or lighting of the panel surface itself around the button.

Figure 30:
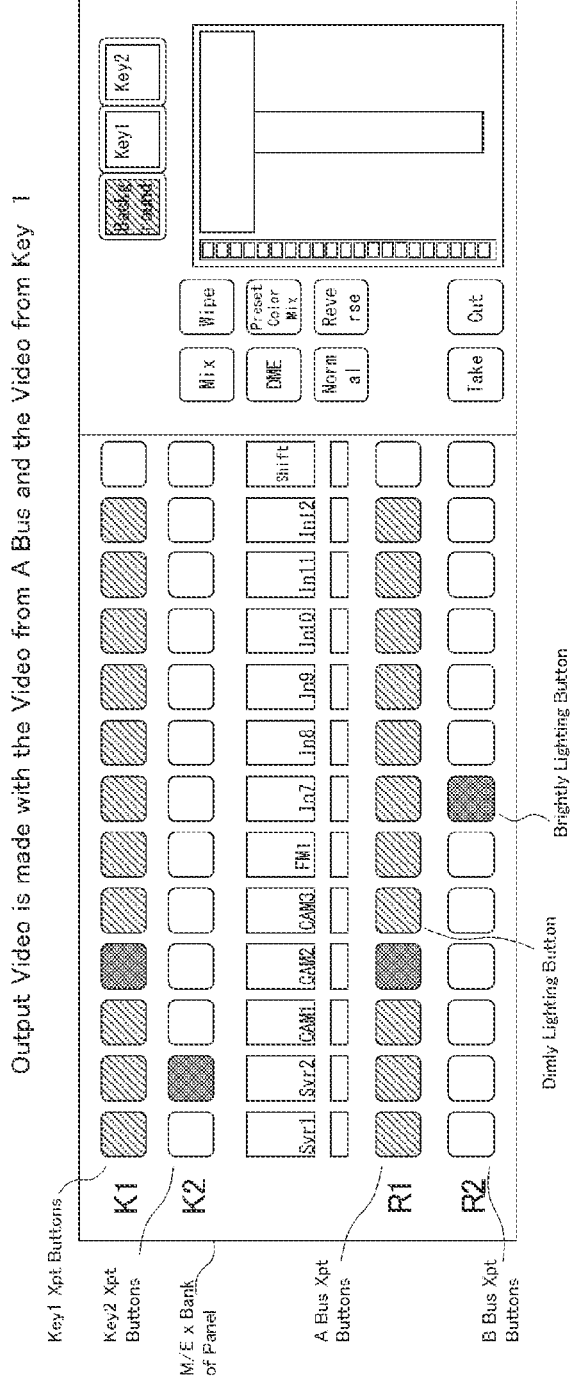
FIG. 30 is a diagram showing an exemplary display (dim lighting of all unselected buttons) of buttons other than a selected xpt button when in a bus toggle off setting.
Figure 31:
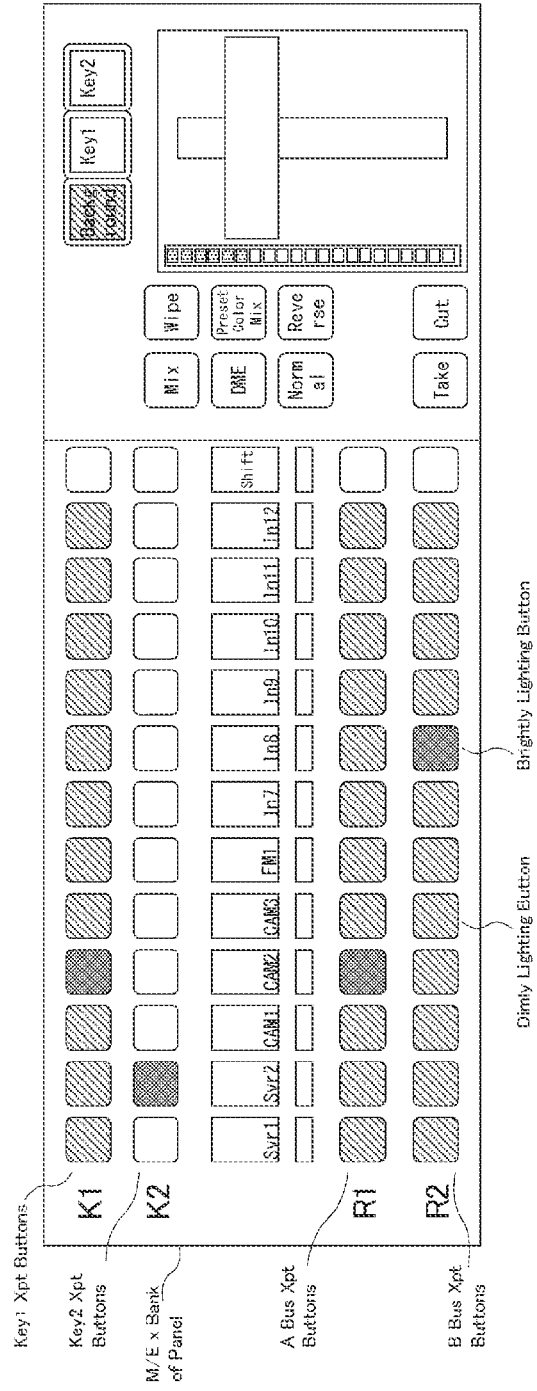
FIG. 31 is a diagram showing an exemplary display (dim lighting of all unselected buttons) of buttons other than a selected xpt button when in a bus toggle off setting.
Figure 32:
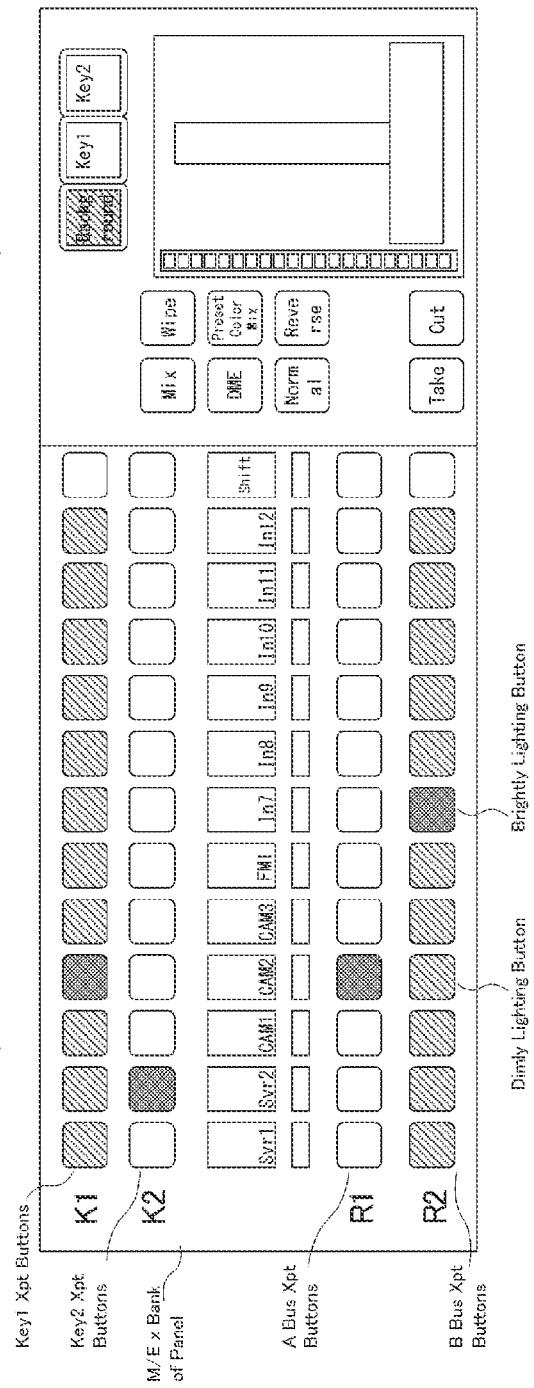
FIG. 32 is a diagram showing an exemplary display (dim lighting of all unselected buttons) of buttons other than a selected xpt button when in a bus toggle off setting.
Figure 33:
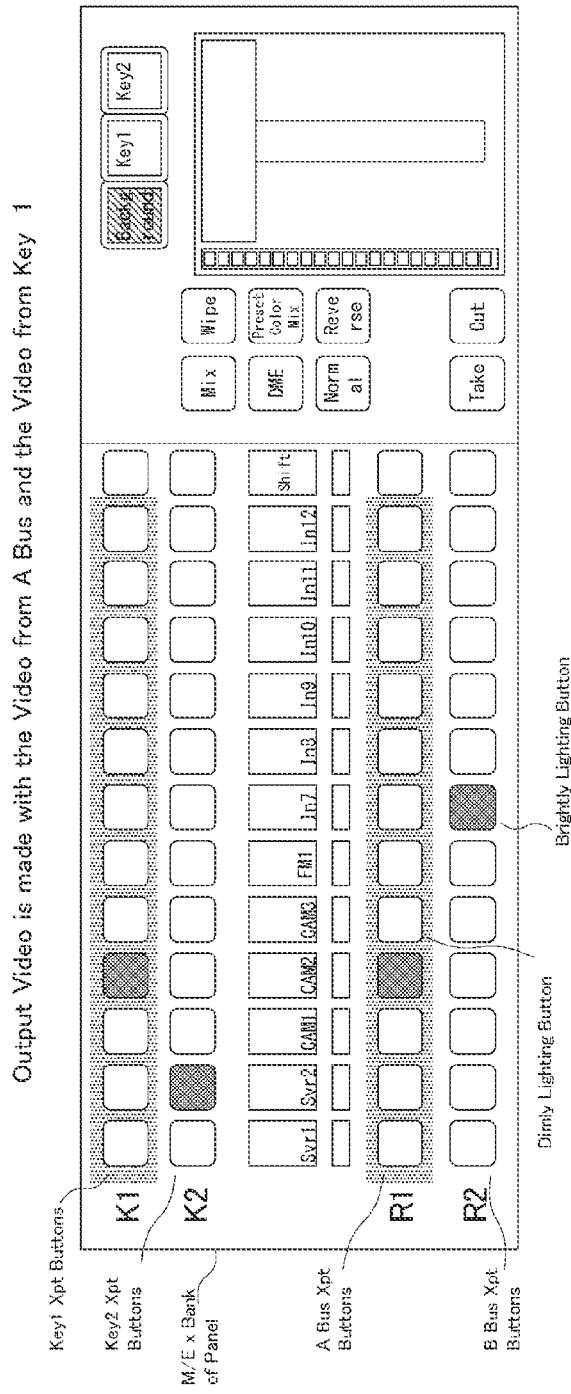
FIG. 33 is a diagram showing an exemplary display (lighting of the panel surface itself around buttons) of buttons other than a selected xpt button when in the bus toggle off setting.
Figure 34:
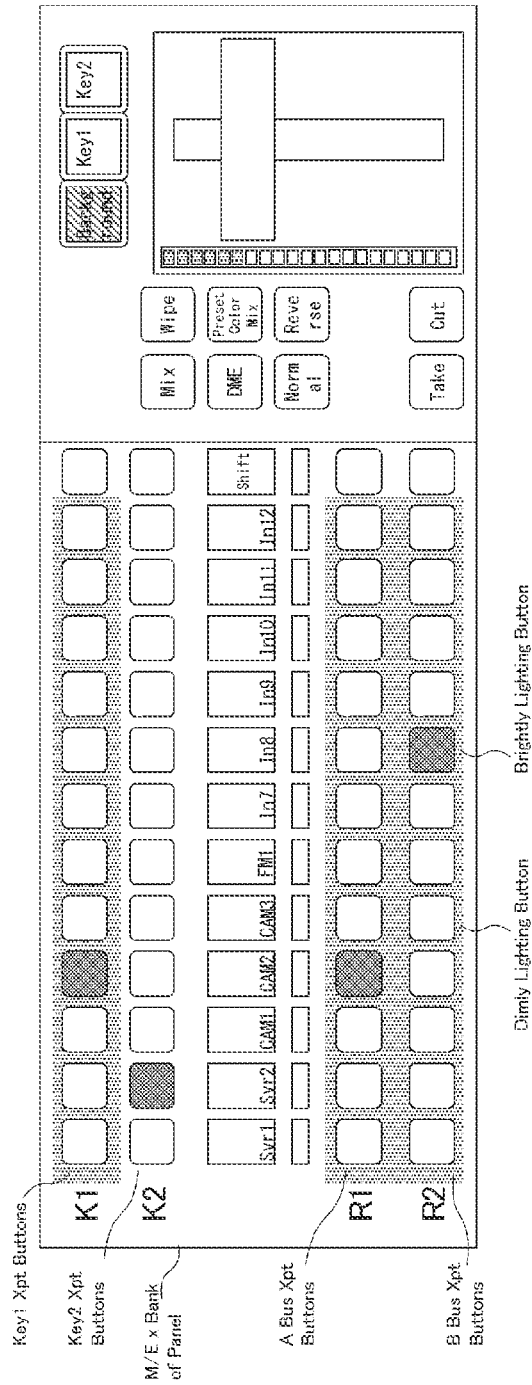
FIG. 34 is a diagram showing an exemplary display (lighting of the panel surface itself around buttons) of buttons other than a selected xpt button when in the bus toggle off setting.
Figure 35:
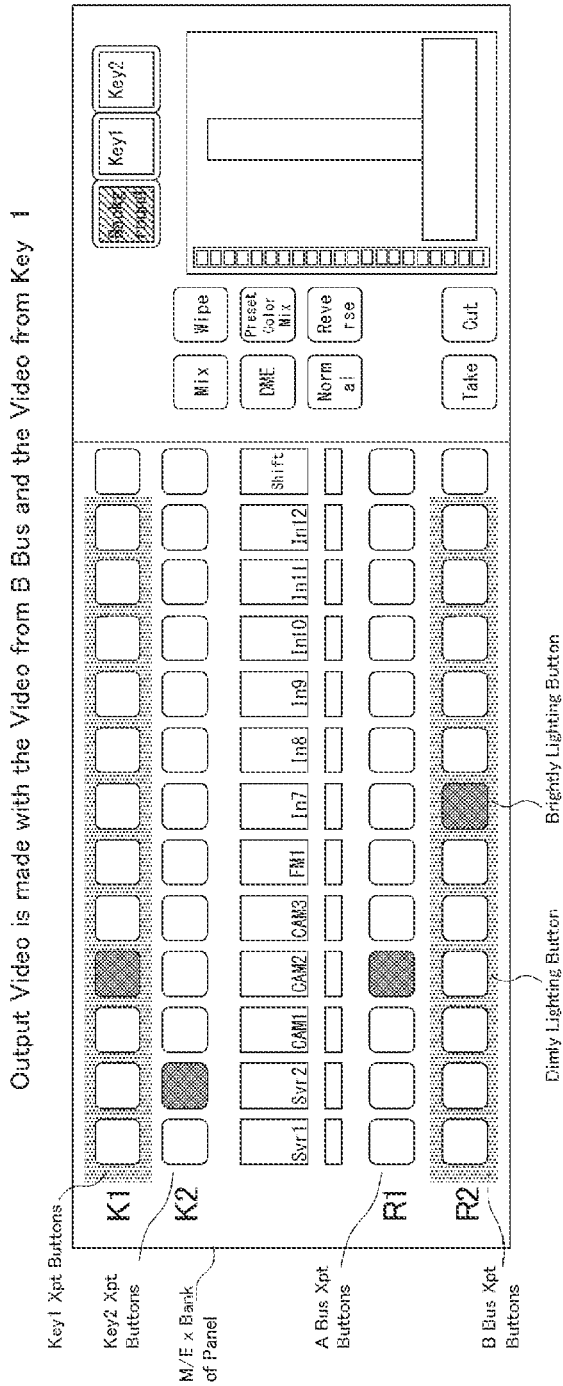
FIG. 35 is a diagram showing an exemplary display (lighting of the panel surface itself around buttons) of buttons other than a selected xpt button when in the bus toggle off setting.

FIG. 30 to FIG. 32 show exemplary displays according to dim lighting of all unselected buttons. In dim lighting, a difference may be indicated by the dim color, besides the system of indicating a difference between dim lighting and turning off. FIG. 33 to FIG. 35 show exemplary displays according to light emission of the panel surface (only) around a relevant button row.

"Assign Setting (Panel Button Lighting in Conjunction with GUI)"

Xpt button assign (for the R1 row and R2 row) of a panel xpt module as in FIG. 8 can be set by a GUI. In FIG. 8, four xpt buttons are assignable. The assign contents are stored in an assign table.

Figure 36A:
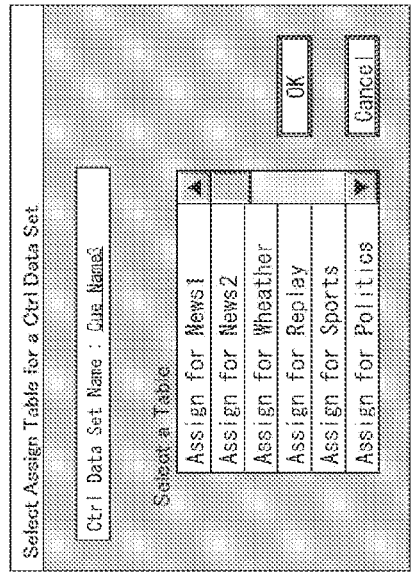
FIGS. 36A and 36B are diagrams showing a GUI for selecting a set of control data (control data set) to be targeted for editing.
Figure 36B:
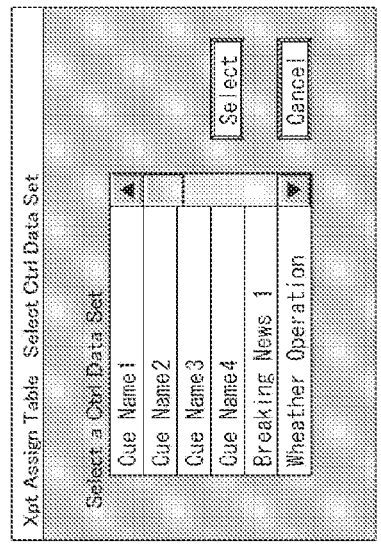

FIG. 36A shows a GUI for selecting a set of control data (control data set) to be targeted for editing, each having a name. FIG. 36B shows a GUI that appears when one is selected in the GUI in FIG. 36A, and is a GUI for selecting an assign table to be set for a selected set of control data. Note that "cue" indicates a set of control data (control data set).

Figure 37A:
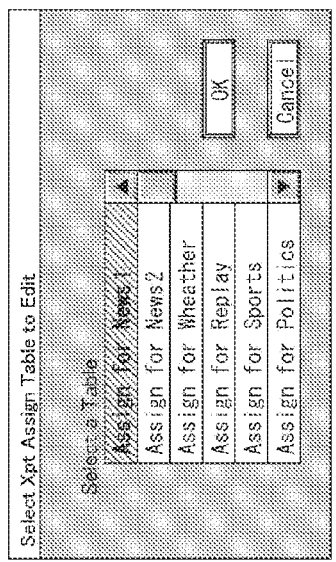
FIGS. 37A and 37B are diagrams showing a GUI for selecting an assign table to be targeted for editing.
Figure 37B:
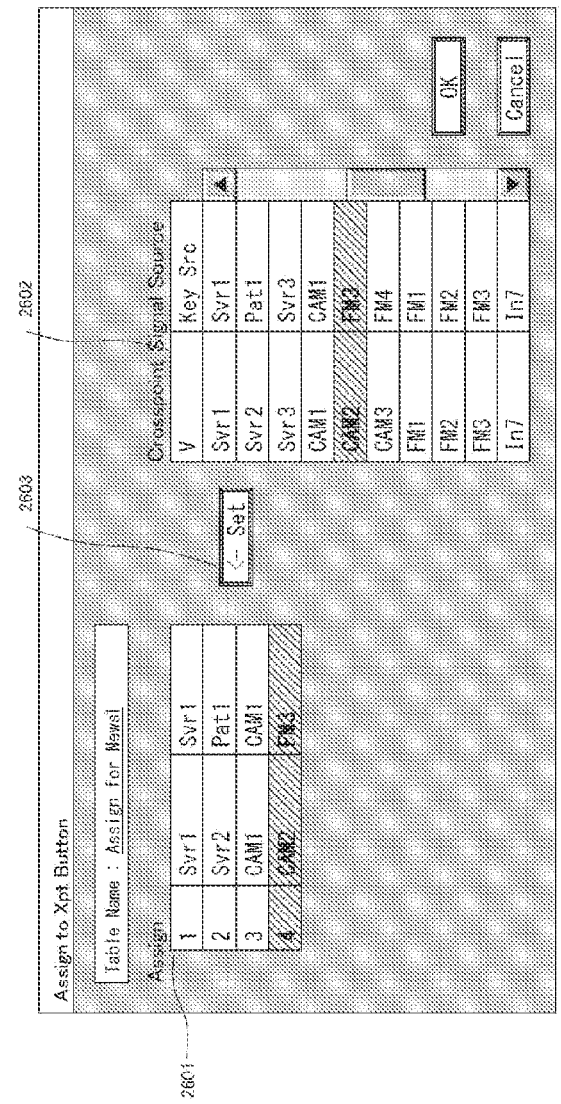

FIGS. 37A and 37B show GUIs for editing an assign table. Assign tables are stored in the panel controller 103. FIG. 37A is a GUI for selecting an assign table to be targeted for editing. FIG. 37B is a GUI that appears when one is selected in the GUI in FIG. 37A, and is a GUI that receives an operation of selecting contents of a selected assign table, that is, a signal source of a xpt to be assigned to each of buttons 1, 2, 3, and 4 for storage in the table.

In the GUI in FIG. 37B, a list 2601 exists that lists buttons and indicates currently assigned contents. One row (one of buttons) of this list 2601 is selected, a xpt function to be assigned is selected in a list 2602, and is set as one of the list 2601 by pressing down a button 2603. When the "OK" button is pressed down, the contents of the list 2601 are stored in the table.

Figure 38:
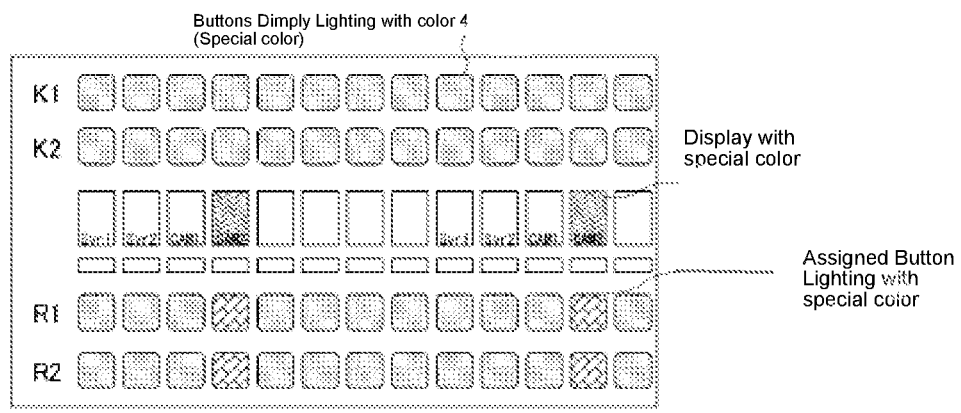
FIG. 38 is a diagram showing an example of a lighting state of the panel surface when editing the assign table.

When the GUI in FIG. 37B is opened, and a row of the list 2601 is selected, the xpt module of the control panel 104 is temporarily brought into a lighting state as in FIG. 38. This is for facilitating a visual recognition of which button is to be assigned. The lighting state in FIG. 38 is a state where the fourth button selected in the list 2601 is highlighted, and also indicates that it is a state different from usual. Relevant four buttons are brightly lighting with a color different from usual, and all the remaining buttons are dimly lighting with a color different from usual. In addition, a source name-use indicator is lighting with a color different from usual.

Figure 39:
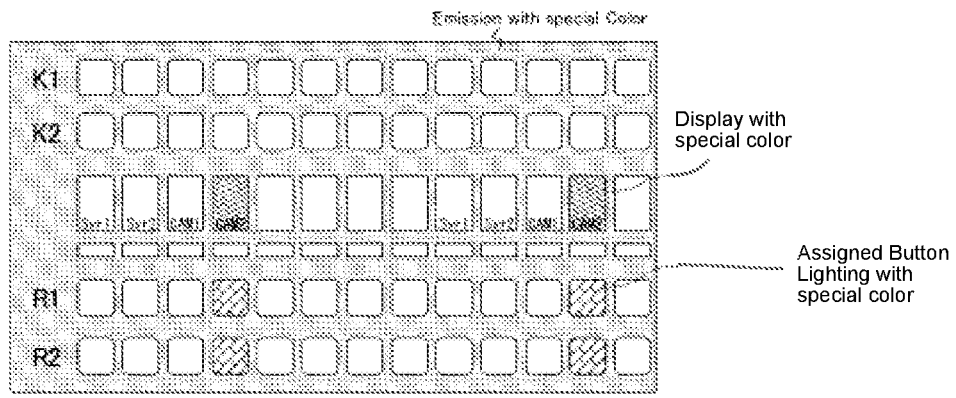
FIG. 39 is a diagram showing another example of a lighting state of the panel surface when editing the assign table.

As another example of a behavior of the panel xpt module of the control panel 104 when one in the list 2601 is selected, a lighting state as in FIG. 39 may be adopted. The lighting state in FIG. 39 is a state where the fourth button selected in the list 2601 is highlighted, and also indicates that it is a state different from usual. Relevant four buttons are brightly lighting with a color different from usual, and the remaining buttons have all been turned off. In addition, the whole panel surface where components are not arranged is slightly emitting light with a color different from usual.

"Preparation and Completion Display of CG Generation Device, Playout Server, and the Like"

A CG generation device (not shown) and signal supply equipment such as the video server 107 may require time (for example, five seconds) until it becomes possible to output requested video content. The reason why time is required is for making a preparation for signal generation such as file reading in the signal supply equipment, establishing a signal route from the signal supply equipment to the vision mixer 105, or the like.

Usually, for such signal supply equipment, an instruction is sent from the device controller 100, the newsroom computer system 111, or the like at the point of time when selected in the Next panel xpt module to make a preparation. It is desirable that, when a set of control data (control data set) as Next is updated, or when operated by the Next panel xpt module, the operator can visually recognize that the preparation has progressed and completed.

FIGS. 40A, 40B, 40C, 40D, and 40E show an example of a method of displaying a preparatory situation easy to visually recognize. FIG. 40A is a state before a certain signal source (Svr1) indicated by a character indicator 1013 is selected. An indicator 1014 is constantly lighting with a color set for an assigned input.

FIG. 40B is a state at a point of time when the Next set of control data (control data set) is updated by a Take or the like or selected with a button pressed down in the panel xpt module. A xpt button 1015 flashes in this case while usually lighting constantly. In addition, in this case, the indicator 1014 also flashes.

FIG. 40C is a state at a point of time when a little time (for example, a second) has elapsed since then. The character background of the character indicator 1013 has a different color partially (in the illustrated example, a region of about 30% from below). FIG. 40D is a state at a point of time when a little more time (for example, two seconds) has elapsed since then. The character background of the character indicator 1013 has a different color partially (in the illustrated example, a region of about 80% from below).

FIG. 40E is a state at a point of time when a little more time has elapsed since then, and a preparation has been completed in the signal source. The xpt button 1015 and the indicator 1014 light constantly. In addition, the character background of the character indicator 1013 has the same color as a whole. Which component flashes and the like are not limited to this example, but there can be variations.

A method of making the panel controller 103 aware of the preparatory situation of the signal supply equipment includes a method of causing the preparatory situation to be transmitted to the panel controller 103 via a communication channel Alternatively, the maximum time for a preparation may be stored for each pieces of signal supply equipment by the panel controller 103, and lighting display may be controlled depending on the time lapse with respect to that maximum time.

Figure 40:
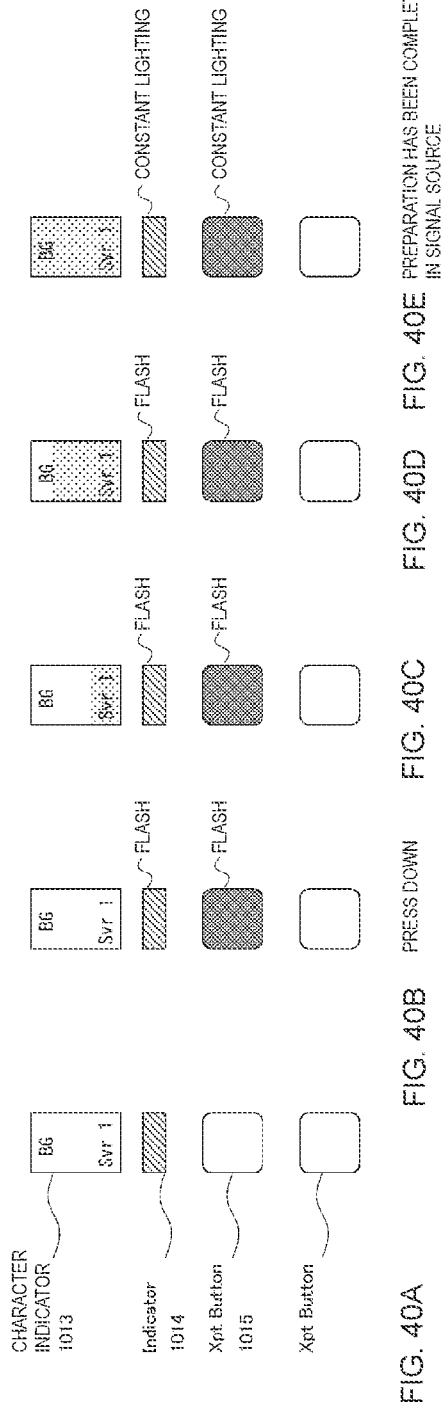
FIGS. 40A, 40B, 40C, 40D, and 40E are diagrams showing an exemplary change in a display of a preparatory situation of a signal source selected by Next.

Note that the display function as in FIG. 40 is also applicable to a manual operation of the OnAir panel xpt module. However, since utilizing a signal from equipment in preparation may arise a social problem in an operation for broadcasting or presentation, the effect can be exercised by making it a function for Next. That is, an operation of reflecting on main line output by a Take after completion of a preparation becomes possible.

In the case where pressing-down of a button, for example, the xpt button 1015 (see FIG. 40), causes control of selecting a plurality of signals (for example, two of a video signal as a picture and a key source signal for a trimming shape), "display of preparation progress" as described above is displayed in agreement with a signal prepared latest among the plurality of signals.

In addition, such circumstances that require time for a preparation exist not only in the signal supply equipment, but also in an operation of changing the orientation of a camera to a designated orientation in the robotic camera system 109, or the like, for example. In the case where equipment (camera) not used on air is selected by Next, control of moving the orientation of the camera in accordance with contents of the Next control data set is immediately performed. Even during such a movement, it is possible to express that a preparation is in progress by the display function as described earlier.

"Emergency"

The video routing matrix switch 114 in FIG. 1 is equipment that performs route switching for a video signal (SDI or IP) such as input/output to/from the vision mixer 105. Usually, the video routing matrix switch 114 is not controlled during an operation. In the case where the vision mixer 105 or the like fails, it is possible to incidentally control this through the control panel 104 to switch a video signal to be a final output.

For example, it is configured such that a special button on the control panel 104 is operated to change the operation mode of the control panel 104, and the final output of the video routing matrix switch 114 is selected by the R2 row. In such a case, in order to indicate that the control panel 104 is in a special mode, the lighting status may be changed, and, for example, the emission color of the panel surface may be changed to a special color.

"Page Switching"

In the function assign button section (1), a button to be a "page switching button" exists, and a page can be switched by pressing down that button. The page is a definition of function assignment on buttons other than the page switching button, present in the function assign button section. By switching the page, the operator can perform an operation of making a selection from among a number of functions larger than the number of buttons for execution.

FIG. 41 shows an example of a page function of the function assign button section (1). FIG. 41(a) shows a state where a page 1 has been brought about. When a page select button "Page Select" is pressed down in this state, a state in FIG. 41(b) is brought about. This state is a page selection state, and when a button of any number is pressed down, a transition is made to a page of that number. FIG. 41(c), (c) is a state where a page 2 has been brought about.

Illustrations in the drawing of functions assigned in this page 2 are as follows.

(1) Enable)/disable of control over camera 1), . . . , camera 4)
(2) Enable/disable of audio device control
(3) Prompt execution of pulse outputs of GPI1, GPI2, GPI3
(4) Switching of an audio device (audio mixer) to an alternative machine
(5) Switching of a video device (vision mixer) to an alternative machine "Another Example of GUI"

Figure 42:
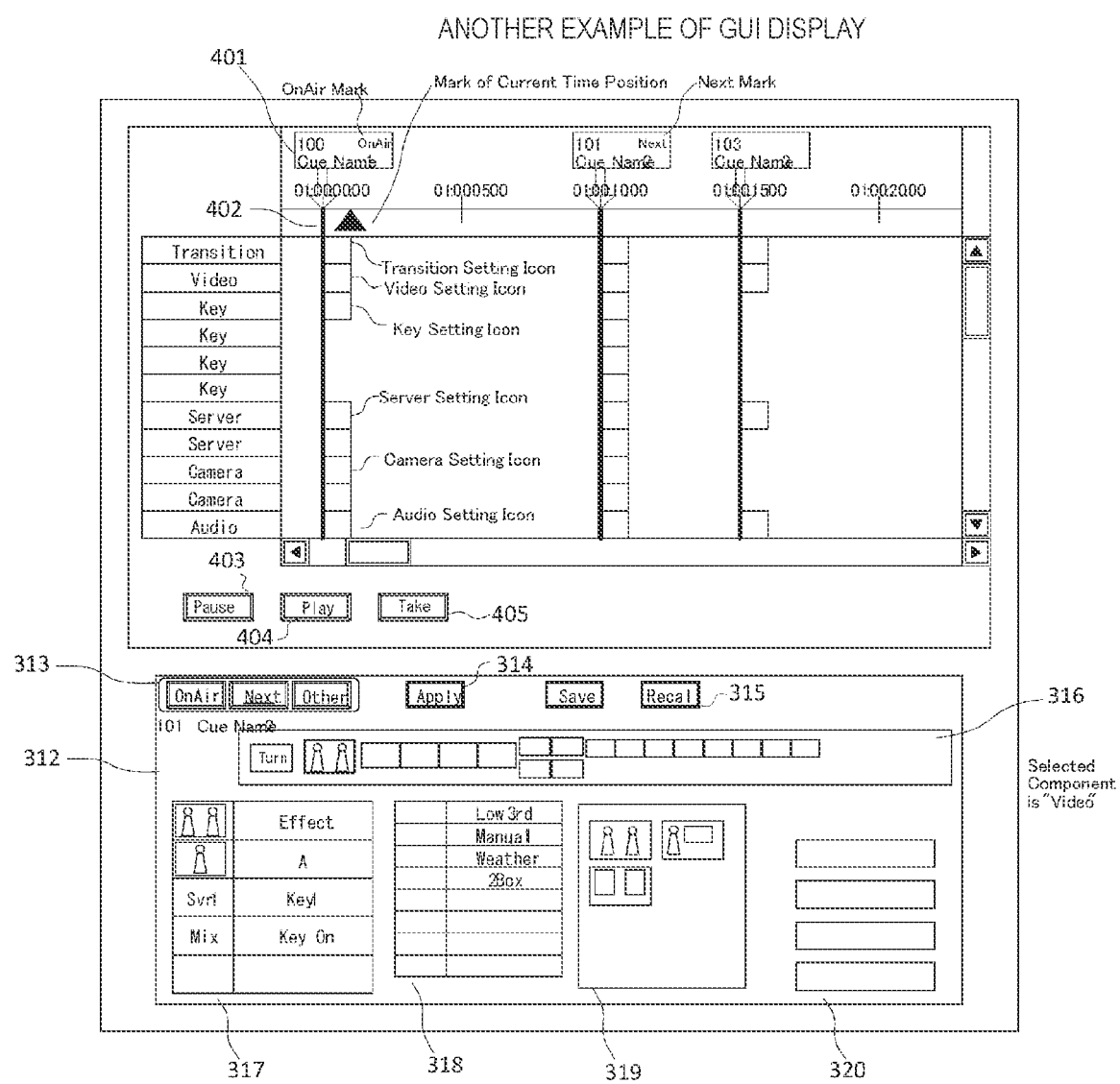
FIG. 42 is a diagram showing another example of a GUI display.

FIG. 42 shows another example of a GUI. In this example, a control data set is in a permutation as a playlist. A relative time (SMPTE time code) is imparted to each control data set in the playlist. In this GUI, there is a timeline in the lateral direction, and vertical lines and the like are displayed at positions relevant to a time code of any control data set in the playlist on the timeline. Then, as vertical rows at the relevant positions, a display concerning the control data set is made in a scroll region.

The name (tag) of a control data set is displayed as a control data set tag 401. At the upper right of this tag, a display of "OnAir" is made for a control data set currently being applied, and a display of "Next" is made for a control data set that should be applied next if progress is made on the timeline.

Icons displayed in contact with a control data set bar 402 as a vertical line are icons (icons showing an overview) imparted to relevant control function portions of that control data set. A rectangular region displayed as "Transition", "Video", or the like on the left end indicates a control function category of the icon displayed in that line (in the lateral direction).

A mark (mark of current time position) indicating the current time on the timeline is a triangular display, and moves on the timeline with progress. When the current time on the timeline reaches a position (time) of any control data set, the control data set is used as Next to execute transition control from OnAir to the Next control data set. Then, the control data set having been Next is brought into the OnAir state.

A pause button 403 stops progress of the current time on the timeline. A play button 404 restarts the progress. A take button 405 causes the current time on the timeline to jump to immediately move forward to the position of a next control data set, and causes a transition to be executed.

The lower half of the GUI in FIG. 42 is substantially similar to the above-described GUI shown in FIG. 11, and corresponding portions are shown with the same reference characters. The cue select buttons 313 are for selecting a control data set to be targeted for editing. There is an "Other" button besides "OnAir" and "Next", and when the "Other" button is pressed down/clicked, a "select a control data set" dialog not illustrated is displayed so that any one of the control data sets in the playlist can be selected, and becomes a target of editing on this screen. That is, by pressing an apply button 314, writing to that control data set is executed.

The recall button 315 is a function of selecting any one of control data sets being held, and accordingly, the contents of a selected control data set are copied to the contents currently being edited on this screen, and written into the control data set (one whose position has been settled in the playlist) by Apply, and applied by Apply. On the other hand, an OnAir recall button and a Next recall button on the control panel 104 are immediately applied by pressing down.

When an icon in the scroll region is clicked, a control data set to which that icon belongs becomes a target of editing (at the lower side of the screen), and similarly to the case where an icon in a component select area is clicked, the category (Transition or the like) of that icon is brought into the state targeted for editing.

As described above, the studio equipment control system 10 shown in FIG. 1 is provided with the Next change operating section, and when a changing operation is received in this Next change operating section, the contents of the Next control data set are changed, and a control signal concerning the Next-use M/E is sent to the vision mixer (switcher) 105 in accordance with the changed contents of the Next control data set. Thus, the operator (user) can simply and easily change the contents of the Next control data set by operating the Next change operating section, and operability can be improved.

2. Variation

Note that, in the above-described embodiment, the examples of FIG. 7, FIG. 9, and FIG. 10 have been listed as exemplary configurations of the control panel 104, whilst the present technology is not limited to them. In addition, in the above-described embodiment, the examples of FIG. 11 and FIG. 42 have been listed as examples of GUI, whilst the present technology is not limited to them.

Additionally, the present technology may also be configured as below.

(1)
A studio equipment control system including:
a Next change operating section configured to receive a changing operation on each item in a Next control data set being in a control state of a Next-use M/E of a switcher; and
a control section configured to, when the changing operation is present, change a content of the Next control data set, and in accordance with the changed content of the Next control data set, send a control signal concerning the Next-use M/E to the switcher.

(2)
The studio equipment control system according to (1), in which
the Next change operating section includes
an edit GUI section configured to receive a changing operation on each item of the Next control data set.

(3)
The studio equipment control system according to (1) or (2), in which
the Next change operating section includes
a xpt button row configured to perform an operation input of selecting a video signal on a xpt circuit belonging to the Next-use M/E.

(4)
The studio equipment control system according to any of (1) to (3), further including:
a display GUI section configured to display the content of the Next control data set.

(5)
The studio equipment control system according to any of (1) to (4), further including:
a transition operating section configured to cause an output video signal of the switcher to transition from an output of an OnAir-use M/E to an output of the Next-use M/E.

(6)
The studio equipment control system according to (5), in which
the transition operating section includes a fader lever configured to manually control progress so as to gradually make a transition from the output of the OnAir-use M/E to the output of the Next-use M/E.

(7) The studio equipment control system according to (5), in which the transition operating section includes a button section configured to send a take trigger to the control section so as to transmit a control signal that instructs a transition to control in accordance with the Next control data set to the switcher.

(8) A method of controlling a studio equipment control system, the method including:

a step of receiving, by a Next change operating section, a changing operation on each item in a Next control data set being in a control state of a Next-use M/E of a switcher; and a step of, when the changing operation is present, changing, by a control section, a content of the Next control data set, and in accordance with the changed content of the Next control data set, sending a control signal concerning the Next-use M/E to the switcher.

(9) A program for causing a computer to execute a method of controlling a studio equipment control system, the method including a step of receiving, by a Next change operating section, a changing operation on each item in a Next control data set being in a control state of a Next-use M/E of a switcher, and a step of, when the changing operation is present, changing, by a control section, a content of the Next control data set, and in accordance with the changed content of the Next control data set, sending a control signal concerning the Next-use M/E to the switcher.

(10) A studio equipment control system including:

a control data set memory configured to store a plurality of control data sets in which control contents for a switcher are compiled;

a device controller configured to send a control signal to the switcher;

an OnAir control state display GUI section configured to display a content of an OnAir control data set being in a control state of an OnAir-use M/E of the switcher;

a Next control state display GUI section configured to display a content of the Next control data set being in a control state of the Next-use M/E of the switcher;

a data controller configured to manage the OnAir control data set and the Next control data set;

any of an OnAir edit GUI section configured to receive a changing operation on each item of the content of the OnAir control data set to send a changing instruction to the data controller or a Next edit GUI section configured to receive a changing operation on each item of the content of the Next control data set to send a changing instruction to the data controller;

an OnAir xpt button row configured to perform an operation input of selecting a video signal on a xpt circuit belonging to the OnAir-use M/E;

a Next xpt button row configured to perform an operation input of selecting a video signal on a xpt circuit belonging to the Next M/E;

a plurality of OnAir recall button sections to each of which one control data set in the control data set memory is assigned as an option, the plurality of OnAir recall button sections being configured to cause an assigned control data set to be copied to the OnAir control data set by pressing down;

a plurality of Next recall button sections to each of which one control data set in the control data set memory is assigned as an option, the plurality of Next recall button sections being configured to cause an assigned control data set to be copied to the Next control data set by pressing down;

a fader lever configured to manually control progress so as to cause an output video signal of the switcher to gradually transition from an output of the OnAir-use M/E to an output of the Next-use M/E; and a button section configured to send a take trigger to the device controller so as to transmit a control signal that instructs a transition to control in accordance with the Next control data set to the switcher, in which the data controller updates a corresponding value in the Next control data set in response to an operation that the Next xpt button row has received, when the content of the OnAir control data set is changed, the data controller sends a control signal concerning the OnAir-use M/E to the switcher in accordance with the content of the OnAir control data set, when the content of the Next control data set is changed, the data controller sends a control signal concerning the Next-use M/E to the switcher in accordance with the content of the Next control data set, and upon receipt of the take trigger, the device controller sends a control signal that instructs start of a transition to the switcher in accordance with the Next control data set.

(11) The studio equipment control system according to (10), in which on a first panel area, the OnAir xpt button row includes a continuous predetermined number of buttons from one end of a row among a plurality of buttons arranged in a row, and the Next xpt button row includes a continuous button row other than the OnAir xpt button row among the plurality of buttons arranged in a row, a plurality of the OnAir recall buttons are arranged on a second panel area, and the first panel area and the second panel area are arranged in an identical row.

(12) A studio equipment control system including:

a control data set memory that stores a plurality of control data sets in which control contents for an audio mixer, a video server, and a switcher are compiled;

a device controller that sends a control data set as a control signal to the audio mixer, the video server, and the switcher;

an OnAir control state display GUI section that displays information about the final control data set that the device controller has used for sending the control signal to the audio mixer, the video server, and the switcher;

a Next control state display GUI section that displays information about a control data set that the device controller plans to use next for sending a control signal to the audio mixer, the video server, and the switcher;

a GUI controller that performs a display in the OnAir control state display GUI section and a display in the Next control state display GUI section at the same time;

a data controller that manages the OnAir control data set and the Next control data set;

any of an OnAir edit GUI section that receives a changing operation on each item of the contents of the OnAir control data set to send a changing instruction to the data controller or a Next edit GUI section that receives a changing operation on each item of the contents of the Next control data set to send a changing instruction to the data controller;

a button section that sends a take trigger to the device controller so as to transmit a control signal that instructs a transition to control in accordance with the Next control data set to to-be-controlled equipment;

an OnAir xpt button row that performs an operation input of selecting a video signal on a xpt circuit belonging to the OnAir-use M/E of the switcher;

an OnAir delegation button row that alternatively selects one of input buses of the OnAir-use M/E to be targeted for control of the OnAir xpt button row;

a Next xpt button row that performs an operation input of selecting a video signal on a xpt circuit belonging to Next M/E of the switcher;

a next delegation button row that alternatively selects one of input buses of the Next-use M/E to be targeted for control of the Next xpt button row;

a plurality of OnAir recall button sections to each of which one control data set in the control data set memory is assigned as an option, the plurality of OnAir recall button sections causing an assigned control data set to be copied to the OnAir control data set by pressing down;

a plurality of Next recall button sections to each of which one control data set in the control data set memory is assigned as an option, the plurality of Next recall button sections causing an assigned control data set to be copied to the Next control data set by pressing down;

a fader lever that manually controls progress so as to cause an output video signal of the switcher to gradually transition from an output of the OnAir-use M/E to an output of the Next-use M/E; and a panel controller that sends an instruction to the switcher in accordance with an operation that the OnAir xpt button row has received and an operation that the Next xpt button row has received, in which the data controller updates a corresponding value in the Next control data set in response to an operation that the Next xpt button row has received, when the contents of the OnAir control data set are changed, the data controller sends a control signal to the to-be-controlled equipment via the device controller in accordance with the contents of the OnAir control data set, when the contents of the Next control data set are changed, the data controller sends a control signal to the to-be-controlled equipment via the device controller in accordance with the contents of the Next control data set, the data controller controls a bus selection function of each button in the OnAir delegation button row so as to be in accordance with the contents of the OnAir control data set, the data controller controls a bus selection function of each button in the next delegation button row so as to be in accordance with the contents of the Next control data set, upon receipt of the take trigger, the device controller sends a control signal that instructs start of a transition to the to-be-controlled equipment so as to transition to an operating state in accordance with the Next control data set, the data controller instructs the GUI controller to update a display determining the contents of the Next control data set as new contents of the OnAir control data set along with execution of the transition, and the panel controller sends an instruction to the switcher in response to an operation that the fader lever has received, and sends an instruction to the device controller to send a control signal that instructs a transition to the to-be-controlled equipment via the device controller so as to transition to an operating state in accordance with the Next control data set.

(13) The studio equipment control system according to (12), including a control panel on which an operable component is arranged, in which an area of a surface of the control panel is used as an OnAir operating area having the OnAir xpt button row and the OnAir delegation button row, and the fader lever is arranged in the same row as the OnAir operating area on the surface of the control panel.

(14) The studio equipment control system according to (13), in which a button for sending the take trigger and the fader lever are arranged in the same area on the surface of the control panel.

(15) The studio equipment control system according to (12), including a control panel on which an operable component is arranged, in which an area of a surface of the control panel is used as an OnAir operating area having the OnAir xpt button row and the OnAir delegation button row, and the plurality of OnAir recall buttons are arranged in the same row as the OnAir operating area on the surface of the control panel.

(16) The studio equipment control system according to (12), including a control panel on which an operable component is arranged, in which an area of a surface of the control panel is used as a Next operating area having the Next xpt button row and the Next delegation button row, and the plurality of Next recall buttons are arranged in the same row as the Next operating area on the surface of the control panel.

(17) The studio equipment control system according to (12), including a control panel on which an operable component is arranged, in which the fader lever is arranged in an area at a position of a surface of the control panel, and an area having the plurality of OnAir recall buttons and the plurality of Next recall buttons are arranged in the same row as the area in which the fader lever is arranged on the surface of the control panel.

(18) The studio equipment control system according to (12), further including:

a transition state setting memory that stores a transition setting when pressing down a xpt button; and a transition state setting button that performs on/off toggle setting on the transition setting when pressing down the xpt button, in which the panel controller in a case where the transition setting when pressing down the xpt button is on, sends an instruction to the switcher such that, when a button in the OnAir xpt button row is pressed down, an output video signal of the switcher gradually transitions from a video signal selected before the pressing down operation to a video signal newly selected by the pressing down operation by a transition in the OnAir-use M/E.

(19) The studio equipment control system according to (13), in which on a first panel area, among a plurality of first buttons arranged in a row, the OnAir xpt button row includes a continuous predetermined number of buttons from one end of the row, and the Next xpt button row includes a continuous predetermined number of buttons not belonging to the OnAir xpt button row among the plurality of first buttons, and the fader lever is arranged in the same row as the first panel area.

(20) The studio equipment control system according to (12), further including:
a plurality of the OnAir xpt button rows and a plurality of the Next xpt button rows, in which
at the same time when the data controller instructs to update a display determining contents of the Next control data set as new contents of the OnAir control data set, along with execution of the transition,
the panel controller
exerts control of interchanging functions of the plurality of OnAir xpt button rows and the plurality of Next xpt button rows so that a button row having been the Next xpt button row before the transition functions as the OnAir xpt button row after the transition.

REFERENCE SIGNS LIST 10 studio equipment control system
100 device controller
101 data controller
102 GUI controller
103 panel controller
104 control panel
105 vision mixer (switcher)
106 audio mixer
107 video server
108 audio server
109 robotic camera system
110 playout server
111 newsroom computer system
112, 113 memory
114 video routing matrix switch
301 OnAir setting display area
302 Next setting display area
303 transition setting icon
304 video setting icon
305 key setting icon
306 server setting icon
307 camera setting icon
308 audio setting icon
309 studio monitor setting icon
311 take button
312 cue edit display area
313 cue select button
314 apply button
315 recall button
317 edit item select area
318 item category select area
319 item setting select area
320 item detail parameter setting area
401 control data set tag
402 control data set bar
403 pause button
404 play button
405 take button

The invention claimed is:

1. A studio equipment control system, comprising:
a Next recall button section that includes a Next recall button, wherein
the Next recall button is associated with a specific control data set that includes display content,
the Next recall button includes a graphical indicator configured to display the display content, and
the Next recall button section is configured to copy the specific control data set to a Next control data set based on an operation on the Next recall button; and
circuitry configured to:
receive a changing operation on each item in the Next control data set, wherein the Next control data set is in a control state of a Next-use Mix Effect Section/Bank (M/E) of a switcher;
change content of the Next control data set based on the received changing operation;
send a control signal to the switcher based on the changed content of the Next control data set; and
control, based on the control signal, the switcher to transition an output video signal from an output of an OnAir-use M/E to an output of the Next-use M/E, wherein the control signal is associated with the Next-use M/E.

2. The studio equipment control system according to claim 1, further comprising an xpt button row configured to perform an input operation to select a specific video signal, wherein the xpt button row is associated with the Next-use M/E.

3. The studio equipment control system according to claim 1, further comprising a display screen configured to display the content of the Next control data set.

4. The studio equipment control system according to claim 1, further comprising a fader lever configured to control the transition from the output of the OnAir-use M/E to the output of the Next-use M/E.

5. The studio equipment control system according to claim 1, wherein the control signal instructs the transition based on the Next control data set.

6. A method of controlling a studio equipment control system, the method comprising:
copying, by a Next recall button section, specific control data set associated with a Next recall button of the Next recall button section to a Next control data set, wherein the specific control data set is copied to the Next control data set based on an operation on the Next recall button,
the specific control data set includes display content, and
the Next recall button includes a graphical indicator;
displaying the display content by the graphical indicator of the Next recall button;
receiving, by circuitry, a changing operation on each item in the Next control data set, wherein the Next control data set is in a control state of a Next-use Mix Effect Section/Bank (M/E) of a switcher;
changing, by the circuitry, content of the Next control data set based on the received changing operation;
sending, by the circuitry, a control signal to the switcher based on the changed content of the Next control data set; and
controlling, by the circuitry based on the control signal the switcher to transition an output video signal from an output of an OnAir-use M/E to an output of the Next-use M/E, wherein the control signal is associated with the Next-use use M/E.

7. A non-transitory computer-readable medium having stored thereon computer-executable instructions that, when executed by a computer, cause the computer to execute operations, the operations comprising:
copying, by a Next recall button section, specific control data set associated with a Next recall button of the Next recall button section to a Next control data set, wherein the specific control data set is copied to the Next control data set based on an operation on the Next recall button, the specific control data set includes display content, and the Next recall button includes a graphical indicator;

displaying the display content by the graphical indicator of the Next recall button;

receiving a changing operation on each item in the Next control data set, wherein the Next control data set is in a control state of a Next-use Mix Effect Section/Bank (M/E) of a switcher;

changing content of the Next control data set based on the received changing operation;

sending a control signal to the switcher based on the changed content of the Next control data set; and controlling, based on the control signal, the switcher to transition an output video signal from an output of an OnAir-use M/E to an output of the Next-use M/E, wherein the control signal is associated with the Next-use M/E.

8. A studio equipment control system, comprising:

a control data set memory configured to store a plurality of control data sets, wherein control contents for a switcher are compiled in the plurality of control data sets;

a device controller configured to send a first control signal to the switcher;

an OnAir control state display GUI section configured to display a content of an OnAir control data set, wherein the OnAir control data set is in a control state of an OnAir-use Mix Effect Section/Bank (M/E) of the switcher;

a Next control state display GUI section configured to display a content of a Next control data set, wherein the Next control data set is in a control state of a Next-use Mix Effect Section/Bank (M/E) of the switcher;

a data controller configured to manage the OnAir control data set and the Next control data set;

one of:
 an OnAir edit GUI section configured to receive a changing operation on each item of the content of the OnAir control data set to send a changing instruction to the data controller, or
 a Next edit GUI section configured to receive the changing operation on each item of the content of the Next control data set to send the changing instruction to the data controller;

an OnAir xpt button row configured to perform an input operation to select a first video signal on a xpt circuit associated with the OnAir-use M/E;

a Next xpt button row configured to perform an input operation to select a second video signal on a xpt circuit associated with the Next-use M/E;

a plurality of OnAir recall button sections, wherein
 a first control data set of the plurality of control data sets in the control data set memory is assigned as an option to each of the plurality of OnAir recall button sections, and
 the plurality of OnAir recall button sections is configured to copy the assigned first control data set to the OnAir control data set based on a press down operation on the plurality of OnAir recall button sections;

a plurality of Next recall button sections, wherein
 a second control data set of the plurality of control data sets in the control data set memory is assigned as an option to each of the plurality of Next recall button sections, and
 the plurality of Next recall button sections is configured to copy the assigned second control data set to the Next control data set based on a press down operation on the plurality of Next recall button sections;

a fader lever configured to manually control progress to cause an output video signal of the switcher to transition from an output of the OnAir-use M/E to an output of the Next-use M/E; and a button section configured to send a take trigger to the device controller to transmit a second control signal, wherein the second control signal instructs the transition based on the Next control data set, wherein the data controller is further configured to:
 update a corresponding value in the Next control data set in response to reception of an operation on the Next xpt button row,
 send a third control signal to the switcher based on a change of the content of the OnAir control data set, wherein the third control signal is associated with the OnAir-use M/E, and
 send a fourth control signal to the switcher based on a change of the content of the Next control data set, wherein the fourth control signal is associated with the Next-use M/E, and the device controller is further configured to send a fifth control signal that instructs start of the transition, wherein
 the fifth control signal is sent to the switcher, and
 the fifth control signal is sent based on the Next control data set and reception of the take trigger.

9. The studio equipment control system according to claim 8, further comprising:

a first panel area, wherein
 on the first panel area, the OnAir xpt button row includes a first continuous number of buttons from one end of a row among a plurality of buttons in the row,
 on the first panel area, the Next xpt button row includes a second continuous number of buttons among the plurality of buttons in the row, and
 the Next xpt button row is different from the OnAir xpt button row;

a second panel area; and a plurality of OnAir recall buttons, wherein
 the plurality of OnAir recall buttons is on the second panel area, and
 the first panel area and the second panel area are in an identical row.

10. The studio equipment control system according to claim 1, wherein the circuitry is further configured to control, during the transition, synthesis of a first video signal of a first M/E of the switcher and a second video signal of a second M/E of the switcher.

* * * * *